(12) United States Patent
Felique et al.

(10) Patent No.: US 8,433,440 B2
(45) Date of Patent: Apr. 30, 2013

(54) METHOD AND APPARATUS FOR CONTROLLING A VENDING MACHINE

(76) Inventors: Pascal Felique, Linkoeping (SE); Christian Felique, Halen (BE)

( * ) Notice: Subject to any disclaimer, the term of this patent is extended or adjusted under 35 U.S.C. 154(b) by 293 days.

(21) Appl. No.: 12/667,941

(22) PCT Filed: Jul. 6, 2007

(86) PCT No.: PCT/BE2007/000074
§ 371 (c)(1),
(2), (4) Date: Jan. 6, 2010

(87) PCT Pub. No.: WO2009/006705
PCT Pub. Date: Jan. 15, 2009

(65) Prior Publication Data
US 2010/0198400 A1    Aug. 5, 2010

(51) Int. Cl.
*G06F 17/00* (2006.01)
(52) U.S. Cl.
USPC .......................................... 700/232; 700/231
(58) Field of Classification Search .................. 700/231, 700/232
See application file for complete search history.

(56) References Cited

U.S. PATENT DOCUMENTS

| | | | | |
|---|---|---|---|---|
| 6,138,175 A * | 10/2000 | deCarmo | ........................ | 710/5 |
| 6,690,275 B2 * | 2/2004 | Long et al. | ........................ | 221/8 |
| 6,695,166 B2 * | 2/2004 | Long | ............................ | 700/238 |
| 6,735,497 B2 * | 5/2004 | Wallace et al. | ............... | 700/232 |
| 6,830,160 B2 * | 12/2004 | Risolia | ........................ | 705/14.5 |
| 7,161,494 B2 * | 1/2007 | Akuzawa | ........................... | 221/8 |
| 7,444,296 B1 * | 10/2008 | Barber et al. | .................. | 705/17 |
| 8,105,535 B2 * | 1/2012 | Kowari et al. | ................ | 221/163 |

* cited by examiner

Primary Examiner — Timothy Waggoner
(74) Attorney, Agent, or Firm — Stattler-Suh PC

(57) ABSTRACT

A solution comprising cost-effective methods and techniques for converting a traditional vending machine into a vending machine with a graphical user interface, multimedia advertising and info kiosk capabilities. A key aspect of this invention is the integration of a consumer DVD player in a vending machine, in which the graphical user interface is implemented as DVD Menu structures stored on a DVD disc that also contains the video clips. Another aspect of this invention, is the changed logic of a traditional vending machine to delay item dispense until a video clip has been played. The present invention provides interfacing methods between a DVD player, a Vending Machine Controller and an optional microcontroller. These methods can be used to implement a communication protocol between a DVD player and a microcontroller. The methods and techniques of the invention can be integrated in an MDB peripheral device of a vending machine.

49 Claims, 18 Drawing Sheets

SL: Speaker Left
SR: Speaker Right
SEL: Selection Panel

SEL = Item selection
RCU = Remote Control Unit

SEL = Item selection
RCU = Remote Control Unit

Figure 19

| Key | Low frequency [Hz] | High frequency [Hz] |
|---|---|---|
| 1 | 697 | 1209 |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| 0 | 941 | 1336 |
| S | 941 | 1209 |
| # | 941 | 1477 |
| A | 697 | 1633 |
| B | 770 | 1633 |
| C | 852 | 1633 |
| D | 941 | 1633 |

Figure 20

| Register | Movies | Bits |
|---|---|---|
| GPRM1 | 1-16 | B15-B0 (Movie 16-Movie 1) |
| GPRM2 | 17-32 | B15-B0 (Movie 32-Movie 17) |
| GPRM3 | 33-48 | B15-B0 (Movie 48-Movie 33) |
| GPRM4 | 49-64 | B15-B0 (Movie 64-Movie 49) |
| GPRM5 | 65-80 | B15-B0 (Movie 80-Movie 65) |
| GPRM6 | 81-96 | B15-B0 (Movie 96-Movie 81) |
| GPRM7 | 97-99 | B15-B0 (Movie 99-Movie 97) |

Figure 21

| Button | Menu 1 | Menu 2 | Menu 3 | Menu 4 | Menu 5 | Menu 6 | Menu 7 |
|---|---|---|---|---|---|---|---|
| 1 | Movie 1 | Movie 9 | Movie17 | Movie25 | Movie33 | Movie41 | Movie49 |
| 2 | Movie 2 | Movie10 | Movie18 | Movie26 | Movie34 | Movie42 | Movie50 |
| 3 | Movie 3 | Movie11 | Movie19 | Movie27 | Movie35 | Movie43 | Movie51 |
| 4 | Movie 4 | Movie12 | Movie20 | Movie28 | Movie36 | Movie44 | Movie52 |
| 5 | Movie 5 | Movie13 | Movie21 | Movie29 | Movie37 | Movie45 | Movie53 |
| 6 | Movie 6 | Movie14 | Movie22 | Movie30 | Movie38 | Movie46 | Movie54 |
| 7 | Movie 7 | Movie15 | Movie23 | Movie31 | Movie39 | Movie47 | Movie55 |
| 8 | Movie 8 | Movie16 | Movie24 | Movie32 | Movie40 | Movie48 | Movie56 |
| 9 | Menu 2 | Menu 3 | Menu 4 | Menu 5 | Menu 6 | Menu 7 | ... |

Figure 22

| B | Menu 1 | Menu 2 | Menu 3 | ... | Menu 10 | Menu 11 | ... |
|---|---|---|---|---|---|---|---|
| 1 | Menu 2<br>Movie 1-9 | Movie 1 | Movie10 | | Movie73 | Menu 12<br>Movie 81-89 | |
| 2 | Menu 3<br>Movie 10-18 | Movie 2 | Movie11 | | Movie74 | Menu 13<br>Movie 90-98 | |
| 3 | Menu 4<br>Movie 19-27 | Movie 3 | Movie12 | | Movie75 | Menu 14<br>Movie 99-107 | |
| 4 | Menu 5<br>Movie 28-36 | Movie 4 | Movie13 | | Movie76 | Menu 15<br>Movie 108-116 | |
| 5 | Menu 6<br>Movie 37-45 | Movie 5 | Movie14 | | Movie77 | Menu 16<br>Movie 117-125 | |
| 6 | Menu 7<br>Movie 46-54 | Movie 6 | Movie15 | | Movie78 | Menu 17<br>Movie 126-134 | |
| 7 | Menu 8<br>Movie 55-63 | Movie 7 | Movie16 | | Movie79 | Menu 18<br>Movie 135-143 | |
| 8 | Menu 9<br>Movie 64-72 | Movie 8 | Movie17 | | Movie80 | Menu 19<br>Movie 144-152 | |
| 9 | Menu 10<br>Movie 73-... | Movie 9 | Movie18 | | Menu 11<br>Movie81-... | Menu 20<br>Movie 153-... | |

Figure 23
| Item/beverage selection | Video Control Movie | Decoded value |
|---|---|---|
| 1 | 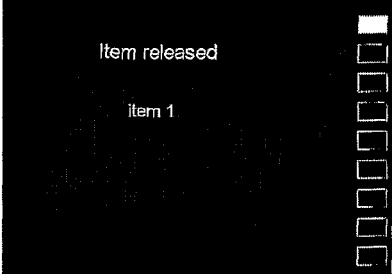 | 0x01 |
| 2 | ... | 0x02 |
| 3 | 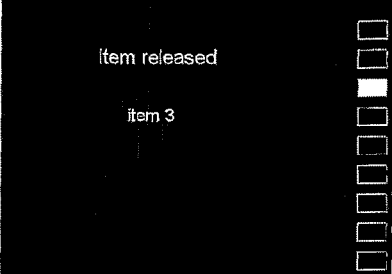 | 0x03 |
| ... | ... | ... |
| 7 | 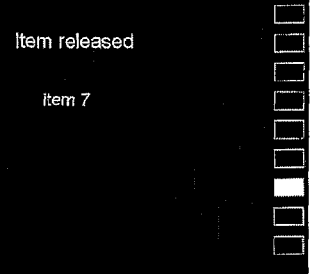 | 0x07 |
| 8 | ... | 0x08 |
| 9 | 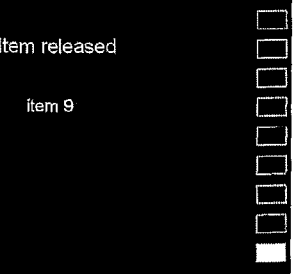 | 0x09 |

Figure 24

| Coin amount | Image # | Selections DVD Menu background image |
|---|---|---|
| 0,00 | 1 | Please insert coins 0,00<br>Make your selection<br>Colas  Lemonades<br>Juices  Waters<br>coin event |
| 0,05 | 2 | Please insert coins 0,05<br>Make your selection<br>Colas  Lemonades<br>Juices  Waters<br>coin event |
| ... | ... | ... |
| 0,35 | 8 | Please insert coins 0,35<br>Make your selection<br>Colas  Lemonades<br>Juices  Waters<br>coin event |
| ... | ... | ... |
| 2,00 | 41 | Please insert coins 2,00<br>Make your selection<br>Colas  Lemonades<br>Juices  Waters<br>coin event |

METHOD AND APPARATUS FOR CONTROLLING A VENDING MACHINE

BACKGROUND OF THE INVENTION

Vending machines are well known in the art. Generally they serve the purpose of selling snacks and beverages but can also be used to sell other items such as newspapers, etc. Item selection in a vending machine is performed by selecting the item using a user interface of the vending machine. The user interface of the vending machine generally contains push buttons for the user to choose the desired item. Generally, a central processor of the vending machine is responsible for the control and activities of said user interface. Most vending machines include a system for receiving payment for the particular article and for dispensing the article from the dispensing department to the merchandise removal area after such payment is received. After paying, the machine releases the product such that it falls in an open compartment at the bottom, or into a cup. The product may also become available by the unlocking of a door, drawer, turning of a knob etc. Sometimes the product is not just released but prepared. Most vending machines are operated by vending companies that offer a wide variety of services, however, companies producing beverages, also own and service a great number of vending machines.

A number of innovations have taken place over the decades in the vending machine business. We name some examples of innovations:

Improved bill and coin validation

Improved sense and feedback systems to verify that the vend was made

Remote monitoring of vending machines

Telemetry to transmit sales and inventory data to a remote location

Cashless vending allowing consumers to use debit cards

Although efforts have been made to make vending machines more attractive to the public such as adding multimedia capabilities for simplifying the operation of the machine, increasing the user interactivity, and playing back audio-visual content on a screen, these have never been implemented on a wide scale basis in the majority of vending machines for dispensing beverages, candies or other items because of the high cost of integrating multimedia capabilities into a vending machine. Vending machines in accordance with prior art that have no graphical user interface and multimedia capabilities are hereinafter referred to as traditional vending machines.

There are vending machine solutions available on the market according to prior art that come with multimedia capabilities such as playing back audio-visual content. The audio-visual content is stored on a storage medium that can be read by a device present in the vending machine. In some configurations the audio-visual content can be updated with content from a remote location over a network connection. When these solutions provide additional multimedia features next to the playback of audio-visual content, e.g. a graphical user interface, and when interfacing with the vending machine is required, these solutions make use of a central processing unit connected to a number of devices: a combination of one or more input devices, and/or one or more output devices, and/or one or more storage devices, and/or one or more interfacing devices.

An input device is used to provide a means for user input such as item selection. The term user is known in the art and should be interpreted hereinafter as the customer being the operator of the input device. Examples of input devices are e.g. a keyboard, a mouse, a light pen, a touch screen, etc.

An output device is used to display audio/visual feedback to the customer. Examples of output devices are e.g. a computer monitor, a television screen, speakers, etc.

A storage device is used by the central processing unit to read/write digital information from/to a storage medium. Different types of storage media are available: flexible floppy discs, hard drives, CD(R), DVD, DVD-R, DVD+R, DVD-RAM, memory stick, USB memory keys, etc.

People skilled in the art recognize that other types of input devices, output devices, storage devices and storage media exist.

In existing vending machine solutions that provide multimedia features such as the playback of audio-visual content and where multimedia content is stored on a DVD disc, a central processing unit is used in case 1) additional multimedia features are provided e.g. a graphical user interface OR in case 2) interfacing with the vending machine is required. When a central processing unit is in use, the central processing unit (computer or similar) uses a storage device (DVD drive or similar) to read the information stored on this DVD disc. A commonly used setup is a computer, connected to a DVD drive. Different types of interface connections are possible between a computer and a DVD drive, e.g. IDE, USB, Firewire, parallel, RS-232, etc. Another commonly used setup is a computer, connected to an industrial Laserdisc/DVD player through the serial RS-232 interface or similar.

In existing vending machine solutions that provide a graphical user interface to the customer, said graphical user interface is implemented by a computer program, set of instruction code or similar running on the central processing unit, other than the central processing unit of the DVD player. Input devices connected to the central processing unit provide a means for user input such as item selection. Output devices connected to the central processing unit are used to display audio-visual feedback to the customer.

SUMMARY OF THE INVENTION

The present invention relates to cost-effective methods and techniques for converting a traditional vending machine into a vending machine with a graphical user interface, multimedia advertising and info kiosk capabilities.

Embodiments of the present invention provide methods and techniques for integrating a stand-alone consumer DVD player in a vending machine, in which the graphical user interface is implemented as DVD Menu structures stored on a DVD disc.

In contrast to vending machine solutions in accordance with prior art, the graphical user interface in our invention is NOT implemented by a computer program, set of instruction code or similar running on a central processing unit other than the DVD player (e.g. computer or similar)

Due to cost effectiveness of the proposed solution, the huge park of existing traditional vending machines can be converted from a beverage/candy/other item dispenser into a media channel for effective local commercials.

A specific aspect of the technology described in this invention, is the changed logic of a traditional vending machine to delay the dispense of the selected item until a video clip has been played. Embodiments of this invention provide methods and techniques to implement the control logic of a delayed vending scenario on a stand-alone consumer DVD player architecture.

Both the graphical user interface and the video clips are stored on a DVD disc. Buttons already available on the selection panel 101 of the vending cabinet and/or the RCU unit 107 of the DVD player 106 or an integration of both of these provide a means for user input such as item selection. Output devices connected to the stand-alone DVD player e.g. LCD screen 108 are used to display audio-visual feedback to the customer (both the graphical user interface and the video clips).

Whereas other computer based multimedia advertising and info kiosk solutions interface with the vending machine using serial, USB or other available computer interfaces, a stand-alone consumer DVD player 106 has no interfacing capabilities at all, except a Remote Control Unit input device 107. Embodiments of the present invention provide interfacing methods between a DVD player 106 and the keyboard decoder 102 of a Vending Machine Controller 100. Other embodiments of the present invention provide interfacing methods between a DVD player 106, a microcontroller 111 and the keyboard decoder 102 of a Vending Machine Controller 100. The interfacing methods between a stand-alone consumer DVD player 106 and a microcontroller 111 can be used to implement a communication protocol between these two devices.

The methods and techniques of the invention can be integrated in an MDB peripheral Slave device of a vending machine compatible with the MDB standard, such that said peripheral device provides a graphical user interface for operating said vending machine.

BRIEF DESCRIPTION OF THE DRAWINGS

The objects and features of the present invention will become more apparent and the invention will be best understood from the following detailed description of the preferred embodiments, when read with reference to the accompanying drawings wherein:

FIG. 19 is a Table of Frequency pairs for each DTMF tone FIG. 20 is a Table of Scratch card registers and corresponding movies FIG. 21 is a Table of Movie entries in the Movie List DVD Menus FIG. 22 is a Table of alternative Movie entries in the Movie List DVD Menus FIG. 23 is a Table of Items and corresponding Screenshots of Video Control Movies FIG. 24 is a Table of bitmaps to represent any credit amount between 0 and Cmax

DETAILED DESCRIPTION

Figure 1:
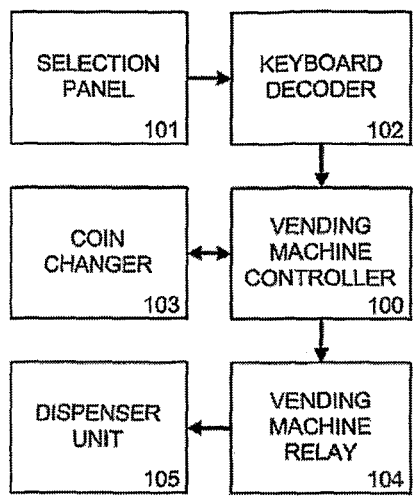
FIG. 1 is a Block diagram of a traditional vending machine

In the vending machine industry, a number of manufacturers have engineered vending machine solutions with multimedia advertising and info kiosk capabilities. These prior art solutions are realized using costly equipment and dedicated software code (embedded systems, PDA's, personal computers, dedicated microprocessor circuits, etc.) These prior art solutions come with several drawbacks: 1) huge cost, 2) impractical integration, 3) no standard hardware, 4) need for Operating System with GUI support, 5) need for custom source code, 6) need for specially adapted user input devices, 7) instable environment subject to hardware and software flaws, 8) huge maintenance costs (computer OS blue screens, network outage in case network connection is involved, etc.) As a result these solutions never really had a commercial breakthrough or are implemented only at small scale level.

The present invention is intended to overcome or to reduce the above described disadvantages of the prior art vending machines with multimedia advertising and info kiosk capabilities. An object of our invention is to provide methods and techniques to implement a solution which: 1) is based on a mass market low-priced consumer playback device 106 that can play back video clips from a DVD disc medium, 2) can be easily integrated, 3) makes use of a stand-alone consumer DVD player 106, 4) has no need for a complex OS/GUI since we use the DVD Menu structure as a GUI, 5) uses DVD discs authored using standard DVD authoring packages, 6) uses buttons already available on the selection panel 101 of the vending cabinet and/or the RCU unit 107 of the DVD player 106 or an integration of both of these, 7) is based on a stable DVD architecture implemented in a SOC core, less subject to hardware and software flaws, 8) requires limited maintenance (no computer OS and no network connectivity are involved).

A DVD player contains firmware that has been extensively tested by the manufacturer. The chance of hardware/software flaws is minor. In the eventual case of a hardware flaw the operator will be able to exchange easily the entire DVD player 106 with a new off the shelf DVD player. The defective DVD player can be taken to a service center for local maintenance.

A DVD medium that stores such content is hereinafter referred to as a "DVD disc" or "DVD" and the machine or system used to play/present the DVD content referred to as a "player" or a "DVD player".

DVD Menu structures used for implementing the graphical user interface for a vending machine and in particular for making an item/beverage selection on said vending machine are hereinafter referred to as Selections DVD Menus.

The term "video clip" can be used interchangeably with the terms "video segment", "video asset", "video message", "commercial clip", "video", "clip" etc. The more specific term "commercial clip" is used when the actual video footage contains commercial advertisements. In one example embodiment of this invention, commercial clips are played. In another example embodiment of this invention, info kiosk clips are played. In a further example embodiment of this invention, music video clips can be played. In yet another example embodiment of this invention, any other type of clip or any combination of different types of clips can be played. Also video may refer to any type of visual content, whether a "still frame", "slide show of stills", animation or other moving visual content.

Likewise the term "audio track" can be used interchangeably with "audio segment", "audio clip", etc. Also, generally, when a video clip is referred to, an associated audio track may also be available.

Also the phrases "to show", "to present", "to play" (and its variations) are used to convey an operation appropriate to the content being presented. One skilled in the art will recognize that other terms could be used interchangeably to yield equivalent embodiments and examples.

Embodiments of the present invention provide methods and techniques for a network independent solution to convert a traditional vending machine into a modern vending machine with a graphical user interface, multimedia advertising and info kiosk capabilities.

In the vending machine industry, a number of manufacturers have engineered proper technology including network architectures, adapted software protocols and distribution models to distribute media content to vending machines. In these configurations, the vending machine is equipped with a microcomputer or equivalent that is configured as a client in a client/server network architecture or any other configuration between two devices where one device acts as a central archive of video clips (the "server") and the second device (the vending machine) on a remote distance is updated with a new set of video clips on a scheduled basis (the "client"). Different connections are possible: 1) closed networks, 2) internet connections (using PSTN, ADSL line, fiber connection, etc.), 3) other communication channels (wireless, Bluetooth, GSM, GPRS, DVB-T, Satellite, etc.).

The problem of network based prior art solutions is that any kind of network architecture oriented solution involves a number of practical challenges including but not limited to: 1) maintenance of both server and clients, 2) maintaining the quality of service on the connection between server and clients, 3) selection of the proper technology and architecture depending on the scale of the roll-out. In case of a hardware or software flaw it can take a considerable amount of time before the problem is resolved. Further the technology and circuits utilized in network based prior art solutions add to the expense of each vending machine.

The purpose of our invention is to present a solution where any of the aforementioned limitations of network oriented content distribution models are not existent. In the proposed solution there is no single use of any type of network connection as described above to exchange video assets from a central archive to a remote vending machine. Exchange of video assets is done by replacing the DVD disc physically in the DVD player 106.

In radio, television and printed media advertising, commercials or advertisements run for a limited time, have a certain play/print frequency and cover a specific geographical area or population (media coverage). In the proposed solution the play frequency of the commercial clips is dependent on 1) the DVD disc swap frequency and 2) the applied algorithm used in the authoring phase of the DVD media. Embodiments of the present invention provide several algorithms, among a sequential and random order play algorithm. The coverage and run time is flexible and subject to the scheduling by the advertising agency. In practice the schedules run by the agency result in a disc authoring/mastering process producing a number of DVD discs for the DVD players inside the vending machines. Different DVD discs can be produced for different geographical areas/populations providing practical means for running low-cost local commercial campaigns.

Advertising agencies or other parties can use off the shelf DVD authoring packages to author a DVD disc which contains both the graphical user interface (implemented as DVD Menu structures) and the video clips. During the authoring process special considerations should be made to respect the interfacing aspects described in this invention. People skilled in the art will appreciate that proper tools and templates can be provided to simplify the authoring/mastering process of DVD discs that comply with the specifications of the solution described in this invention.

The practical organization (disc authoring, scheduling of commercials, replacement of DVD media at the right time and place) can be implemented as a business model. A business model where advertising agencies work in close collaboration with vending machine service companies can easily be run.

Figure 17:
FIG. 17 shows Media coverage details labeled on the DVD disc

The discs produced by the advertising agencies or DVD disc publishing companies can be labeled with 1) area code, 2) vending machine number range, 3) target group, 4) run start date of disc, 5) run end date of disc, 6) a bar code, 7) any other code or descriptive text specifying and detailing the media coverage of the disc. FIG. 17 illustrates the Media coverage details labeled on the DVD disc. This way vending operators responsible for maintaining and refilling beverages/candies/other items in the vending machine business, or other parties which are responsible for replacing the DVD medium in the business model presented in one embodiment of this invention, can take care of properly replacing the DVD disc with a newly updated disc if necessary.

The term "vending machine" is intended to encompass dispensers for different types of items: beverages, candies, etc. People skilled in the art will appreciate that the methods and techniques provided in embodiments of this invention can be applied to different types of vending machines, including but not limited to beverage vending machines, candy dispensers, etc. Hereinafter the expressions "beverage/item", "item/beverage", "beverage/candy/other item" are used as a generic expression to indicate example items that can be dispensed by the vending machines.

In achieving the above objectives, the solution for a preferred embodiment of the present invention consists of at least: 1) a stand-alone consumer DVD player 106, 2) an LCD display 108, 3) audio speakers, 4) either a DTMF decoder circuit 110 OR optical sensors 109 mounted on a reserved area of the LCD screen, 5) an optional microcontroller circuit 111 and an IR sender 114. (4) is used for interfacing between the DVD player 106, (an optional microcontroller 111) and the Vending Machine Controller 100. The DTMF decoder circuit 110 monitors audio signals on the audio connections of the DVD player 106. The optical sensors 109 monitor a reserved region on the LCD screen 108 connected to the video connection of the DVD player 106. Example embodiments of this invention provide methods and techniques to use special Audio and Video Control Movies that produce the proper audio/video signals on the audio/video connections of the DVD player 106.

A specific aspect of the technology described in this invention, is the changed logic of a traditional vending machine to delay the dispense of the selected item until a video clip has been played. Embodiments of this invention provide methods and techniques to implement the control logic of a delayed vending scenario on a stand-alone consumer DVD player architecture. The actual implementation on the DVD player side is done using instruction code for this control logic. Computer instructions are implemented on a DVD architecture.

DVD players have 16 General Purpose Register Memories, called GPRMs. The 16 bits wide registers can be used to store values, and can be considered as memory locations just like memory registers on a microprocessor.

DVD players have a limited instruction set to perform all kind of operations. The operations supported by DVD players are limited to mathematical manipulations and storage operations on values stored in registers, which are presented to users as opcodes, much in the same way assembly language is presented for low-level programming of computers. A maximum number of 128 operations (opcodes or commands) can be executed before and after a PGC (collection of chapters) is played.

In the DVD standard there is a construct known as a Program Chain or PGC. Video fragments, corresponding audio, and menus, are typically arranged as cells which are grouped into chapters (also known as programs or parts of titles) which are stored in a PGC. Program chains are further grouped into titles, which are stored in a Video Title Set. There are maximum numbers of each of these content types within each level of the stored DVD data. People skilled in the art know what the limitations are in the DVD standard.

PGCs can be titles or menus. PGCs can have commands that get executed before they start playing or after they finish. To differentiate between menus and titles, PGCs used as titles are hereinafter referred to as DVD Movie objects, PGCs used as menus are hereinafter referred to as DVD Menu objects.

People familiar with the DVD standard know that there are instructions to jump from one DVD Menu object or DVD Movie object to another DVD Menu object or DVD Movie object.

Instructions coded on a DVD disc must be placed in either a pre/post statements section that complement a DVD Menu or a DVD Movie object. Each DVD Menu object contains a number of menu items that can execute code when selecting or activating this menu item or button within the active menu.

About pre/post/button statements for DVD Menu objects: The pre statements section is executed before activation of the DVD Menu object. The post statements section is executed after the DVD Menu object is finished playing (in case of loop mode). The button statements are executed after a menu item selection has been made in the DVD Menu object.

About pre/post statements for DVD Movie objects: The pre statements section is executed before play out of the DVD Movie object. The post statements section is executed after play out of the DVD Movie object.

To better understand the specific aspect of a delayed vending scenario, we will discuss the VEND scenario on a traditional vending machine and compare this scenario with the delayed vending scenario implemented in embodiments of this invention.

Figure 8:
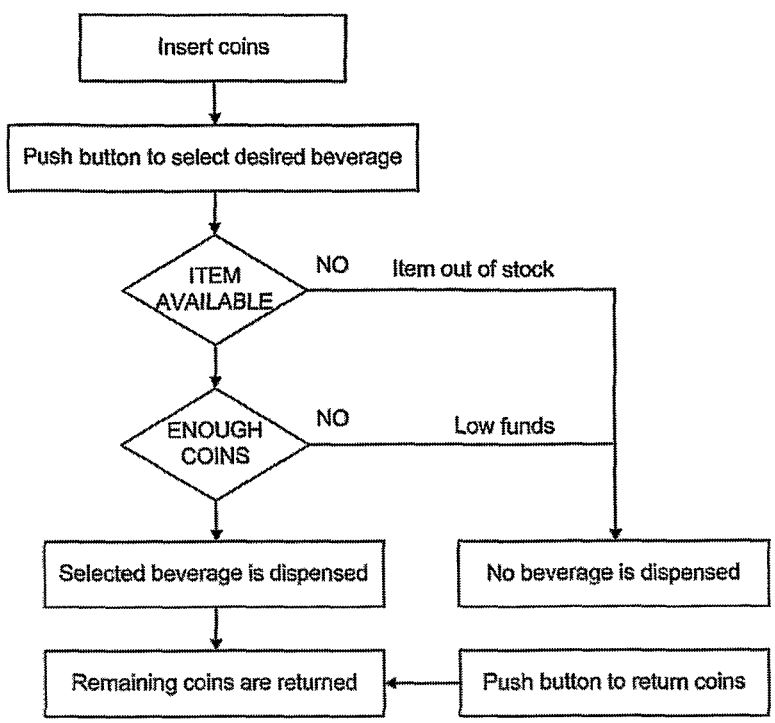
FIG. 8 is a Flowchart for the Vend scenario on a traditional vending machine

The VEND scenario on a traditional vending machine consists of at least the following steps: 1) the customer inserts coins in coin changer 103, 2) the customer pushes a button to select the desired beverage/item on a selection panel 101, 3) the selected beverage/item is dispensed through a dispenser unit 105 when the vend was successful. A flowchart for the Vend scenario on a traditional vending machine is shown in FIG. 8. Next to coins other means for payment are possible: e.g. bills, debit cards, credit cards, etc.

In a traditional vending machine the beverage/item selection buttons of the selection panel 101 are directly connected to the keyboard decoder 102 of the Vending Machine Controller 100. FIG. 1 shows a block diagram of a traditional vending machine.

The expression "keyboard decoder of Vending Machine Controller" can be used interchangeably with the expressions "keyboard decoder integrated in the Vending Machine Controller", "keyboard decoder connected to the Vending Machine Controller", "key panel connected to the internal communication bus in the vending machine e.g. MDB Universal Satellite Device peripheral used as MDB slave device". One skilled in the art will recognize that different types of configurations between key panel, keyboard decoder and Vending Machine Controller exist.

To implement the delayed vending scenario in which the selected item is dispensed after a random/sequential video clip has been played, the buttons on the selection panel 101 of the vending cabinet are disconnected from the keyboard decoder 102 of the VMC 100.

Whereas other computer based multimedia advertising and info kiosk solutions interface with the vending machine using serial, USB or other available computer interfaces, a standard consumer DVD player 106 has no interfacing capabilities at all, except a Remote Control Unit input device 107.

Embodiments of this invention provide interfacing methods between a DVD player 106, (an optional microcontroller 111) and a Vending Machine Controller 100. These methods do not involve any hardware modification inside the DVD player 106, but are realized through the standard audio and video connections on the DVD player. The advantage of this approach is a solution that works for any kind of DVD player independent of the brand and model. (DVD players must comply with the DVD standard and certain specifications stated later in this invention.)

Figure 2:
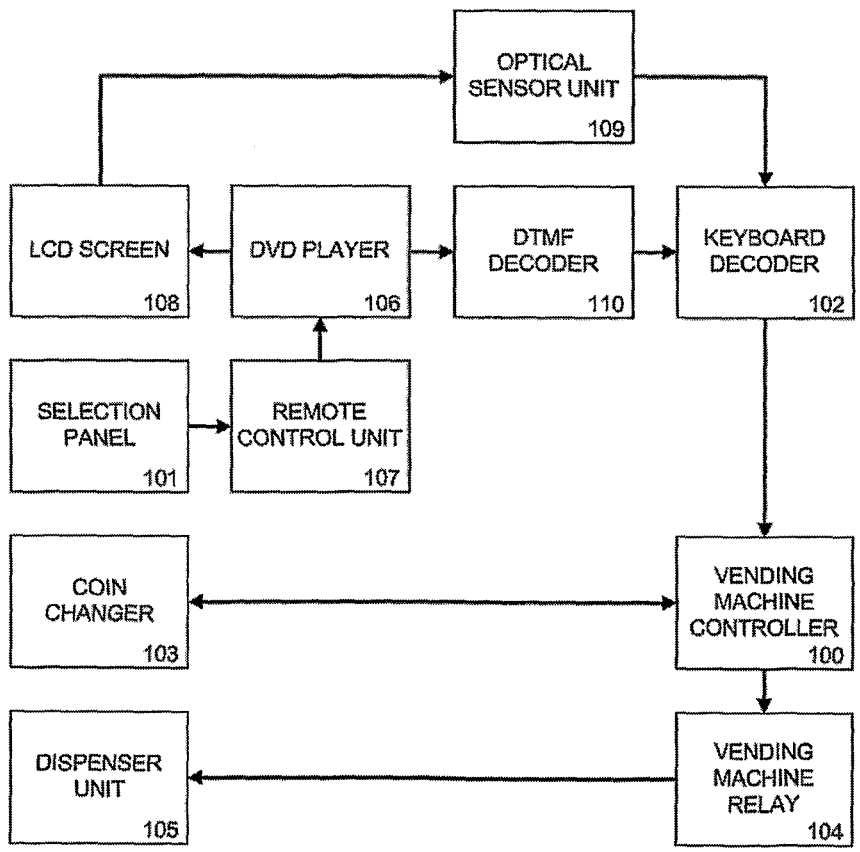
FIG. 2 is a Block diagram of a converted vending machine without extra microcontroller

In one embodiment of the present invention, we provide methods and techniques to implement a solution without extra microcontroller. This embodiment is hereinafter referred to as "solution without microcontroller". FIG. 2 shows a block diagram of a converted vending machine without extra microcontroller.

In this embodiment, the User/vending machine interaction is implemented by mapping the beverage/item selection buttons of the selection panel 101 on the vending cabinet with the DVD remote control unit 107. Pushing a button on the selection panel 101 of the vending cabinet activates a button on the RCU unit, which sends an IR command to the DVD player 106. This way the vending cabinet buttons can be used to navigate a graphical user interface implemented as a DVD Menu structure.

Although the IR transmission between the IR sender on the RCU unit 107 and the IR receiver on the DVD player 106 is wireless, in an example embodiment of this invention, a direct physical connection can be realized between the electronics before the IR sender on the RCU unit 107 and the electronics after the IR receiver on the DVD player 106. This provides a more reliable connection between the two devices. People skilled in the art know how a wireless IR connection can be modified into a wired connection.

Further in this embodiment, optical sensors 109 activated by Video Control Movies are connected to the keyboard decoder 102 of the VMC 100. Alternatively a DTMF decoder 110 which is activated by Audio Control Movies is connected to the keyboard decoder 102 of the VMC 100.

Special Control Movies on the DVD disc and appropriate electronics based on optical sensors 109 and/or DTMF decoder 110 or others sensing the video/audio content on these Control Movies translate a beverage/item selection in a Selections DVD Menu into a proper electronic signal wired to the keyboard decoder 102 of the Vending Machine Controller 100. As a result a beverage/item selection in a Selections DVD Menu is similar as pressing a button on the selection panel 101 of a traditional vending machine cabinet, in which the outer buttons are directly connected to the keyboard decoder 102 of the Vending Machine Controller 100. It should be noted that the Control Movies are only played after the sequential/random video clip has been played, to implement the delayed dispense scenario. More details about the Control Movies and the interfacing method between the DVD player 106 and the Vending Machine Controller 100 using audio/video signals are discussed further on.

The VEND scenario on a vending machine which is converted—applying the methods and techniques in the embodiments of this invention—in a solution without extra microcontroller consists of at least the following steps: 1) the customer inserts coins in a coin changer 103, 2) the customer selects the desired beverage/item in a graphical user interface (using navigation buttons on selection panel 101), 3) the DVD player 106 will play a random or sequential video clip on the front panel LCD display 108 when the vend was successful or unsuccessful, 4) the DVD player 106 will play a special Control Movie to instruct the VMC 100 to dispense the initial selected item, 5) the selected beverage/item is dispensed through the dispenser unit 105 after the video clip is finished and when the vend was successful.

Figure 9:
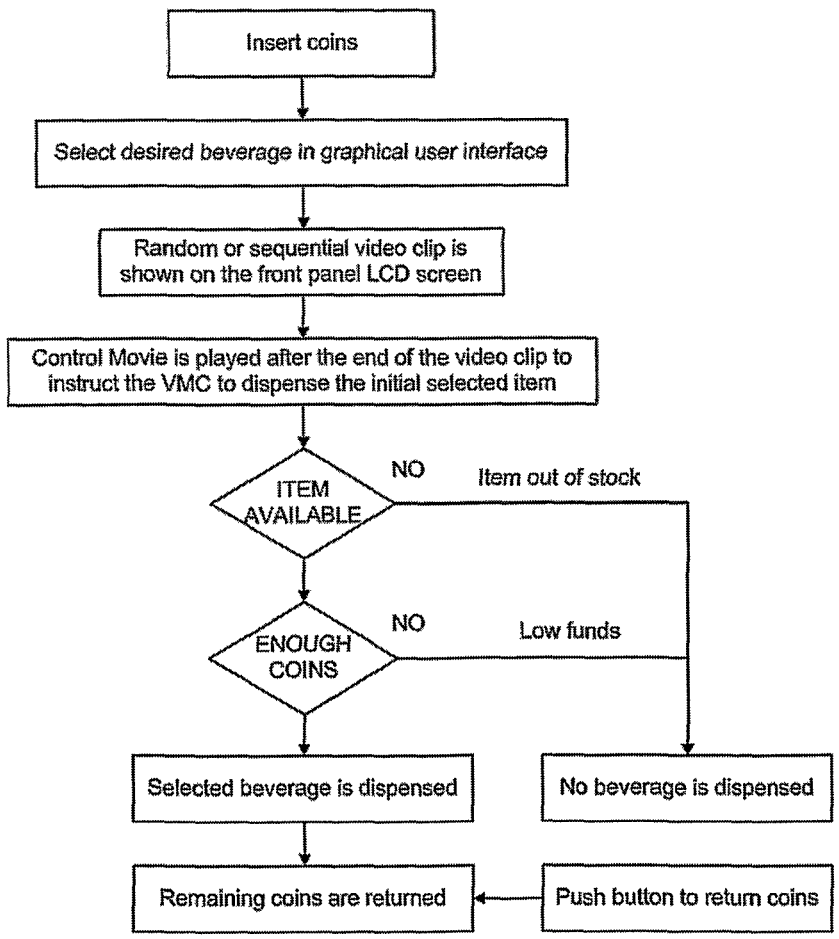
FIG. 9 is a Flowchart for the Vend scenario on a converted vending machine without extra microcontroller

A flowchart for the Vend scenario on a converted vending machine without extra microcontroller is shown in FIG. 9. This VEND scenario implements the delayed dispense scenario: from the beverage/item selection, to the play-out of a video clip and eventually dispensing the selected item.

Example of a VEND Scenario:

When the customer selects item "5", a sequential/random video clip is played and afterwards a specific Control Movie is played—which either activates sensor "5" in the optical sensor panel 109 mounted on the LCD screen 108, or produces DTMF_5 tone that gets decoded to number "5" by the DTMF decoder 110 connected to the audio connections of the DVD player 106—to signal beverage/item selection "5" to the VMC 100. If the vend was successful, the item will be dispensed.

Figure 3:
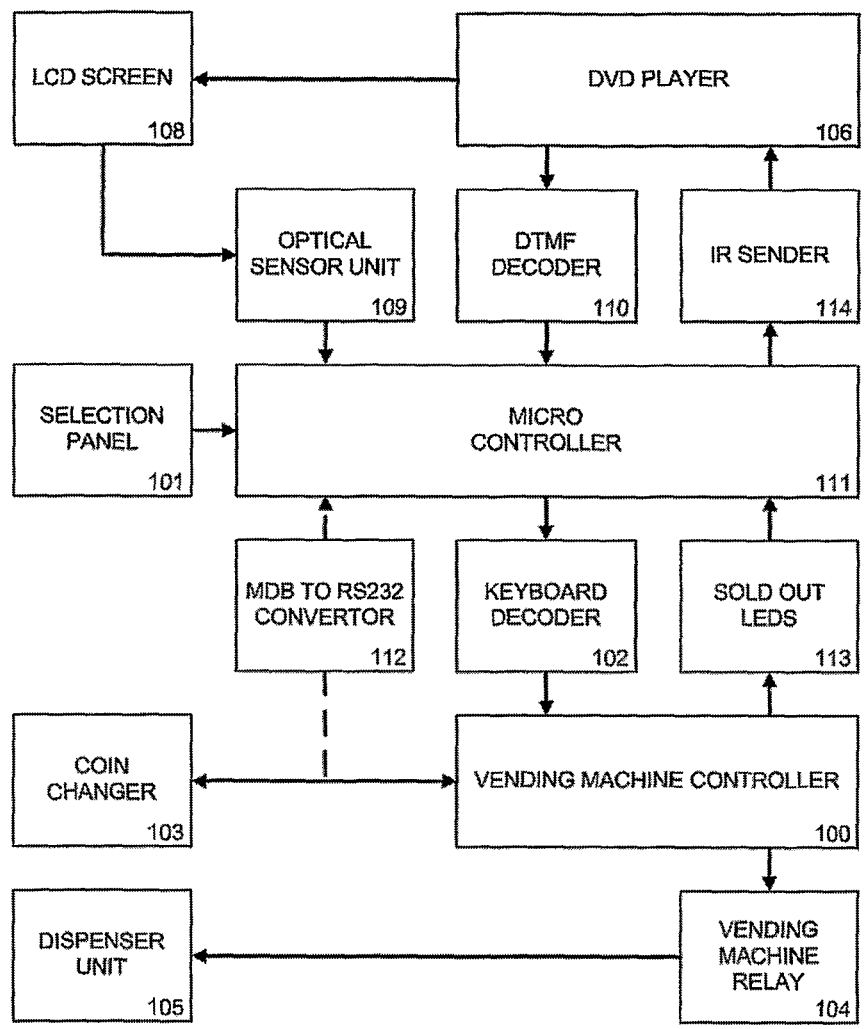
FIG. 3 is a Block diagram of a converted vending machine with extra microcontroller

In an alternative embodiment of this invention, we provide methods and techniques to implement a solution with a microcontroller. This embodiment is hereinafter referred to as "solution with microcontroller". A microcontroller is added for monitoring credit status and item availability, to handle unsuccessful vends properly in the vending machine. FIG. 3 shows a block diagram of a converted vending machine with extra microcontroller.

In this alternative embodiment the beverage/item selection button panel 101 is decoded and connected to a microcontroller 111. People skilled in the art of computer electronics know how to monitor and decode button presses on the keyboard panel 101 with the microcontroller unit 111, using a keyboard decoder and proper interfacing methods.

The microcontroller is connected to an IR sender electronic circuit 114, and is able to operate the DVD player 106 by sending IR commands. The microcontroller 111 is connected to the keyboard decoder 102 of the Vending Machine Controller 100 and is able to instruct the VMC 100 to dispense a specific item through the dispenser unit 105.

The microcontroller 111 can operate in 2 modes, each serving another purpose:

1) Input mode: As long as the customer did not make an actual item/beverage selection in the graphical user interface, the microcontroller will pass on button presses on the selection panel 101 of the vending cabinet to the DVD player 106 by translating each button press to an appropriate IR command corresponding to a proper button on the DVD Remote Control Unit 107 through IR sender 114. While the microcontroller 111 is in Input mode, the customer can navigate in the graphical user interface for making a beverage/item selection.

2) Decision mode: After the customer made an actual beverage/item selection in the graphical user interface, the microcontroller 111 will check if the vend can be approved. While the microcontroller is in decision mode, the microcontroller no longer passes on button presses on selection panel 101 to the DVD player 106.

Further in this embodiment, the microcontroller 111 is connected to appropriate electronics based on optical sensors 109 and/or DTMF decoder 110 or others sensing the video/audio content on the Control Movies. By sensing the video/audio content on these Control Movies, the microcontroller 111 in input mode gets informed about the beverage/item selection in a Selections DVD Menu and switches to decision mode. By sensing the video/audio content on these Control Movies, the microcontroller 111 in decision mode gets informed about the end of playback of an information video message or video clip. More details about the Control Movies and the interfacing method between the DVD player 106 and the microcontroller 111 using audio/video signals are discussed further on.

Depending on the selected item, credit status and item availability, the microcontroller 111 instructs the VMC 100 to dispense the selected item. As a result a beverage/item selection in a Selections DVD Menu is similar as pressing a button on the selection panel 101 of a traditional vending machine cabinet, in which the outer buttons are directly connected to the keyboard decoder 102 of the Vending Machine Controller 100.

The VEND scenario on a vending machine which is converted—applying the methods and techniques in the embodiments of this invention—in a solution with extra microcontroller consists of at least the following steps: 1) the customer inserts coins in coin changer 103, 2) the customer selects the desired beverage/item in a graphical user interface, 3) the DVD player 106 will play a special Control Movie to signal the beverage/item selection to the microcontroller 111, 4.1) the DVD player 106 will play a random/sequential video clip on the front panel LCD display 108 when the vend was successful, 4.2) a "sold out" video message is played when the beverage/item is no longer available, 4.3) a "low funds" video message is played when the customer did not insert enough credit, 5) the DVD player 106 will play a special Control Movie to indicate the end of the information video message or video clip, 6.1) the selected beverage/item is dispensed through dispenser unit 105 when the vend was successful, 6.2) the customer can make another desired selection in the graphical user interface or can insert more credit when the vend was unsuccessful.

Figure 10:
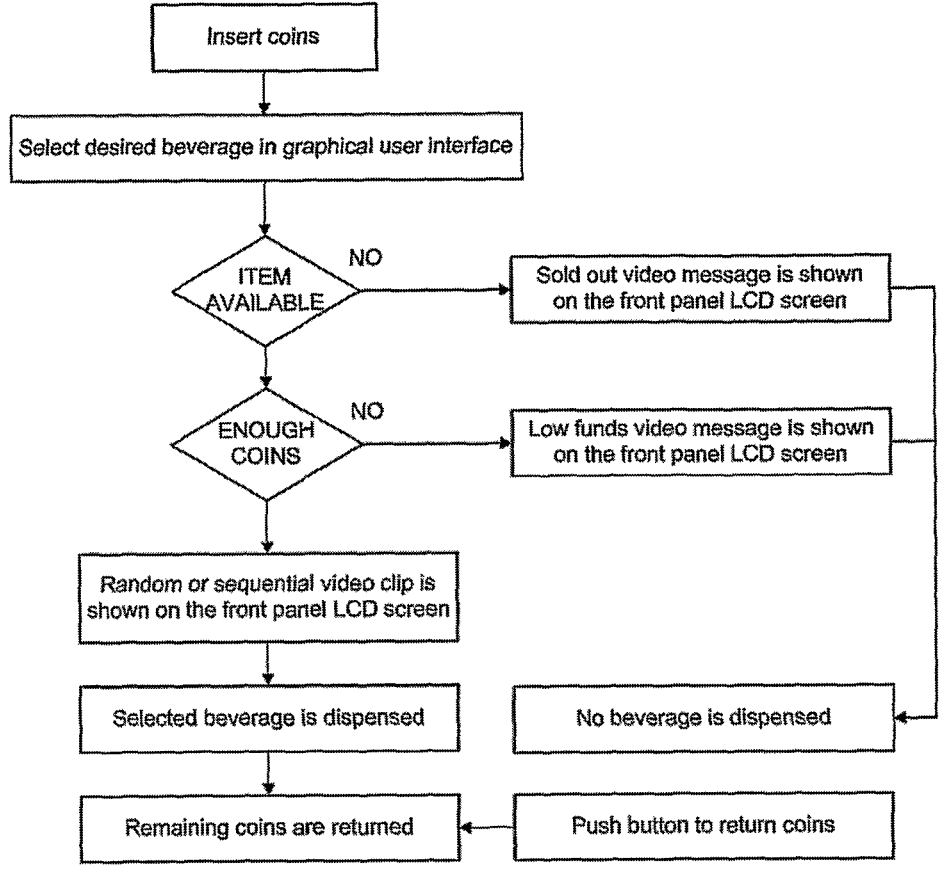
FIG. 10 is a Flowchart for the Vend scenario on a converted vending machine with extra microcontroller

A flowchart for the Vend scenario on a converted vending machine with extra microcontroller is shown in FIG. 10. This VEND scenario implements the delayed dispense scenario: from the beverage/item selection, to the play-out of an information video message when the vend was unsuccessful or the play-out of a video clip and eventually dispensing the selected item when the vend was successful.

It should be noted that in the embodiment of this invention where we propose a solution WITH a microcontroller, the electronic circuits to process Control Movie signals (109, 110) are connected to the microcontroller 111 in contrast to another embodiment of this invention where we propose a solution WITHOUT microcontroller. In the latter embodiment, the electronic circuits to process Control Movie signals (109,110) are connected to the keyboard decoder 102 of the Vending Machine Controller 100. These two different configurations are each presented as separate embodiments of the present invention.

Figure 5:
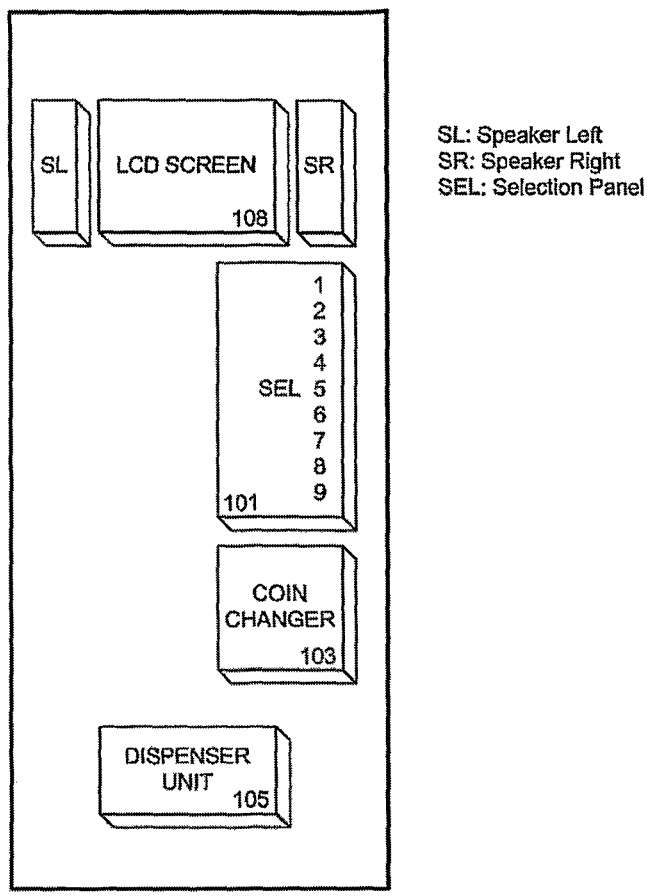
FIG. 5 shows Modifications to the outer cabinet of a traditional vending machine

In a preferred embodiment of the present invention, a number of modifications are made to the outer cabinet. The description of modifications set forth below is not intended to represent the only form in which the exemplary embodiments may be constructed or utilized. One skilled in the art will recognize that different modifications can be used to accomplish the techniques of the present invention that achieve the same functionality. In a preferred embodiment of the present invention, at least the following modifications are made to the outer cabinet: The LCD display 108 and audio speakers will be integrated into the front cover of the vending cabinet. Most vending cabinets come with replaceable front covers that can be easily exchanged. The existing front cover will be replaced with a custom front cover of similar outer dimensions. An opening is shaped in the front cover which can house the LCD display 108 and speakers. To protect the LCD display 108 and speakers against vandalism, a protective shield to cover the LCD display 108 and a sound permeable mesh to cover the speakers can be used. Most front panels offer enough space to integrate LCD displays 108 (and speakers) with a small form factor. The current space is mostly used for light tubes to illuminate the marquee. In some cases it is desirable not to install the video screen and other components in the existing vending machine, but it is instead desirable to install the components adjacent or on top of the existing machine. FIG. 5 illustrates the modifications to the outer cabinet of a traditional vending machine.

The video output of the DVD player 106 will be connected to an LCD display 108. In case a computer LCD display is used, an additional (S)VIDEO to (S)VGA converter module shall be used when the DVD player has no (S)VGA output connector. Different types of video connections between the DVD player 106 and the LCD display 108 are possible, e.g. composite video, component video, RGB, HDMI and other future video standards. Next to LCD displays, it is evident that other display types could be used as well: CRT screens, plasma screens, etc. The audio outputs will be connected to integrated LCD speakers or external speakers.

In a traditional vending cabinet, the customer pushes a button on the selection panel 101 of the vending cabinet to select a beverage/item. The selection panel 101 from a traditional vending machine is connected to the keyboard decoder 102 of the Vending Machine Controller 100. The VMC controller is connected to other logic in the apparatus and the selected item will be dispensed through a dispenser unit 105 when the vend was successful.

Figure 25:
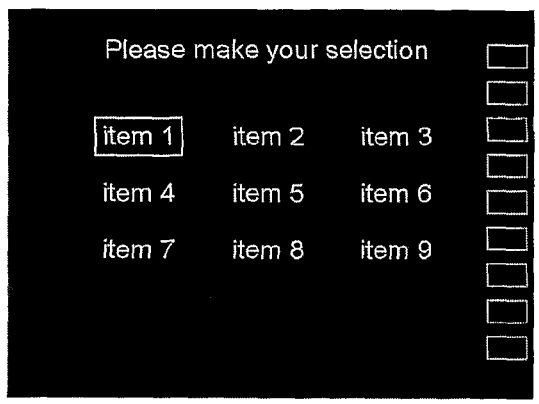
FIG. 25 shows a Screenshot of Item selection in a graphical user interface
Figure 36:
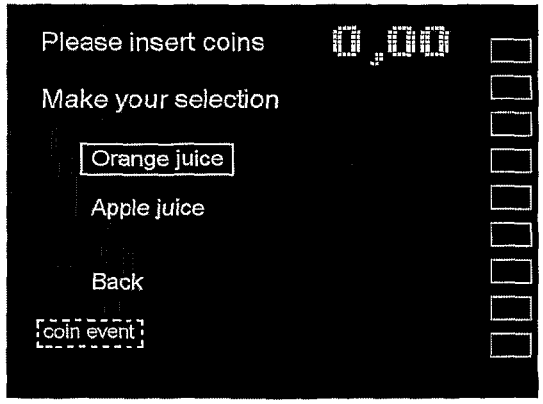
FIG. 36 shows a Screenshot of a hierarchical Sub Selections DVD Menu

In a vending machine which is converted—applying the methods and techniques in embodiments of this invention— the customer can select a beverage/item in a graphical user interface. FIG. 25 shows a screenshot of Item selection in a graphical user interface. The Selections DVD Menu can be made hierarchical. FIG. 36 shows a screenshot of a hierarchical Sub Selections DVD Menu.

The graphical user interface for selecting items is implemented as a DVD Menu structure. On a commercial DVD disc, such as a movie, documentary or other content available on public available DVD discs, a DVD Menu structure allows the viewer to select a specific chapter/movie scene from the disc. The active selection is highlighted, and the viewer can navigate from one chapter to the other chapter by either using the arrow buttons or one of the numerical buttons on the Remote Control Unit 107. Within a DVD Menu, the numerical buttons can be used for absolute menu item selections, whereas the arrow buttons can be used for relative navigation from the previous menu item selection to the next menu item selection and still require an OK button to confirm the menu item selection.

To integrate the DVD Menu User Interface into a traditional vending cabinet, the buttons on the selection panel 101 are disconnected from the keyboard decoder 102 of the VMC 100. This is necessary to implement the delayed vending scenario in which the selected beverage/item is dispensed after a random/sequential video clip has been played, and not immediately after the button has been pressed. The existing buttons on the traditional vending cabinet will be given a new purpose: buttons for navigating the graphical user interface.

In one embodiment of the present invention, where we propose a solution without extra microcontroller, the buttons on the selection panel 101 of the vending cabinet will be mapped to the DVD Remote Control Unit 107. In this way we can use the buttons on the front panel of the vending cabinet to control the DVD Menus.

There are different approaches to implement beverage/item selection in the proposed solution without microcontroller—based on the integration of a DVD player 106 in traditional vending cabinets.

Figure 6:
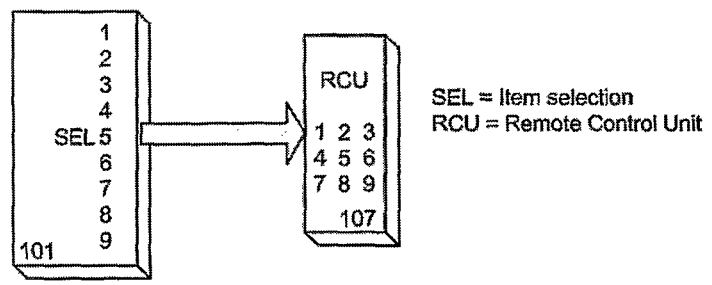
FIG. 6 illustrates the Mapping of existing front panel buttons to absolute numerical RCU buttons

In one embodiment of this invention (approach 1), we map the existing front panel buttons to absolute numerical buttons (button "1"-button "9") on the DVD RCU 107. The buttons are then used for immediate item selection (item "1"-item "9"). FIG. 6 illustrates the mapping of existing front panel buttons to absolute numerical RCU buttons. This approach has several advantages: Very cost effective, the existing buttons on the front panel of a traditional vending cabinet (typically beverage/item 1 to beverage/item 9) can still be used. No visual changes have to be made to the front panel of the vending cabinet. However the disadvantage of this approach is the low degree of interactivity since we do not provide real navigation capabilities expected in a graphical user interface. Navigation buttons are typically arrow buttons (LEFT, RIGHT, UP and DOWN) and the ENTER button. Providing these navigation buttons offers a higher degree of interactivity, already available on today's DVD Remote Control Units.

Figure 7:
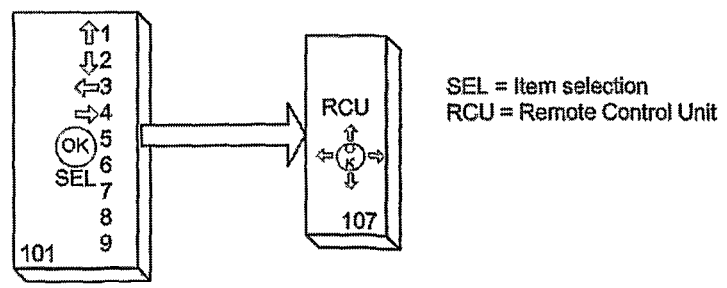
FIG. 7 illustrates the Mapping of existing front panel buttons to navigation RCU buttons

In another embodiment of this invention (approach 2), the existing buttons on the front panel of a traditional vending cabinet (typically beverage/item 1 to beverage/item 9) can still be used but will be given new labels (LEFT, RIGHT, UP, DOWN and ENTER) and will be mapped to the corresponding navigation buttons of the RCU 107. FIG. 7 illustrates the mapping of existing front panel buttons to navigation RCU buttons.

In a further embodiment of this invention (approach 3), we will implement approach 1 and add additional buttons to the front panel of the cabinet to provide navigation within the DVD Menu structure. The new buttons will be given labels (LEFT, RIGHT, UP, DOWN and ENTER) and will be mapped to the corresponding navigation buttons of the RCU 107.

In yet another embodiment of this invention (approach 4), one could imagine that in the nearby future it is feasible that touch screen LCD/DVD combos will be released on the market. In this case such a combination of touch screen LCD and DVD could be used in our proposed vending solution. There will be no need for physical buttons, since any user interaction is performed by selecting DVD Menu items on the touch screen.

In an alternative embodiment of this invention, we provide methods and techniques to implement a solution with a microcontroller. In this alternative embodiment, the microcontroller 111 will pass on button presses on the selection panel 101 of the vending cabinet to the DVD player 106 by translating each button press to an appropriate IR command corresponding to a proper button on the DVD Remote Control Unit 107 through an IR sender 114. A similar mapping as the mapping implemented in approaches 1, 2 and 3 can be used here as well. In this way we can use the buttons on the selection panel 101 of the vending cabinet to control the DVD Menus and in particular the Selections DVD Menus.

Figure 26:
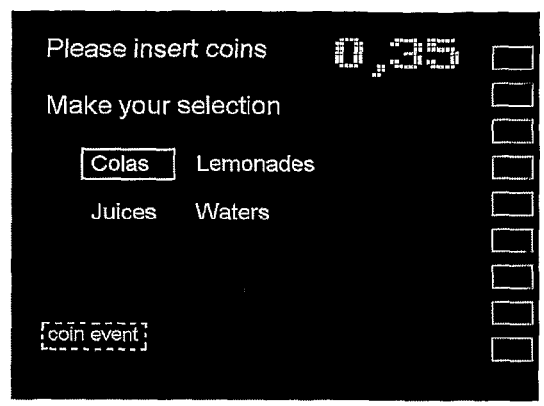
FIG. 26 shows a Screenshot of Item selection in a more advanced graphical user interface

By using DVD Menu structures to implement the graphical user interface, the same look & feel can be reached as professional grade DVD productions. There are advanced tools available today on the market to exploit the full benefit of DVD technology for creating interactive menus with animated buttons and inline video thumbnails. These tools can be used to author the DVD discs used in our proposed solution. FIG. 26 shows a screenshot of Item selection in a more advanced graphical user interface.

Embodiments of the present invention provide methods and techniques for converting a traditional vending machine into a vending machine with a graphical user interface, multimedia advertising and info kiosk capabilities. The proposed solution converts a traditional vending machine into a media channel for effective local commercials and/or info kiosk. The video clips are stored as video assets on the DVD medium (either titles or chapters) next to the DVD Menu structures—which are used for the graphical user interface. Embodiments of the present invention provide a means to play the video clips in either a sequential or random order. Different approaches are possible:

In one embodiment of this invention (approach 1), the video clips are played in sequential order. For every new vend transaction, a counter (GPRM register) which holds the title/chapter number is increased and the video clip corresponding to the current counter value is played back. When the counter reaches the maximum value (total amount of video titles/chapters) it is reset to zero. This approach guarantees that all video clips are played in sequential order.

In another embodiment of this invention (approach 2), the video clips are played in random order with possible repeats. For every new vend transaction, a GPRM register which holds the title/chapter number is set to a random value using the PSEUDO RANDOM number generator available on consumer DVD players. The video clip corresponding to the register value is played back. The drawback of the approach used in this embodiment of the invention is that some video clips could be repeated before all the other random video clips have been played. The playback frequency of a video clip is unpredictable. Another embodiment of this invention uses a random playback algorithm that might be better suited for advertising purposes.

In a further embodiment of this invention (approach 3), the video clips are played in random order without possible repeats. We apply the same principles as in the embodiment using approach 2, but we implement a scratch card algorithm to keep track of the titles/chapters which already have been played, to guarantee that none of the video clips played in the random sequence, are repeated before all the other random video clips have been played.

By way of example, the DVD disc could contain 100 commercial clips. Over a sequence of 100 VEND transactions each commercial clip is played out just one time (Each VEND transaction plays one randomly drawn commercial clip after the user selects a beverage/item in a graphical user interface). After a sequence of 100 VEND transactions, the scratch card is cleared.

In one embodiment of this invention a public information kiosk feature can be added to the methods and techniques provided in other embodiments of this invention. When the vending machine is unattended (no VEND in progress) the DVD player can play a public information kiosk movie or a set of information kiosk movies in either sequential or random order in loop mode. By implementing a TIMEOUT in the Main Selections DVD Menu—used for the graphical user interface—the DVD Player will jump from the Main Selections DVD Menu to the public information kiosk movie and loop this movie (or a set of movies) until a button is pressed on the vending cabinet. This principle is analogous to a screen saver feature on a personal computer.

Figure 12:
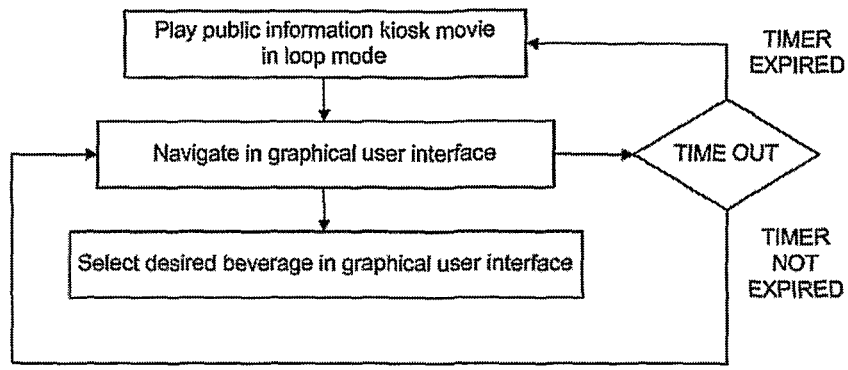
FIG. 12 is a Flowchart for the Public information kiosk movie in loop mode

When a customer approaches the vending machine and presses a button on the front cover, the DVD Player will leave the KIOSK mode and jump to the Main Selections DVD Menu. A flowchart for implementing a Public information kiosk movie in loop mode is shown in FIG. 12.

People skilled in the art recognize how a time out feature can be implemented according to the DVD standard by using two SPRM system registers: a Navigation Timer (SPRM9 register) and a SPRM register that points to a PGC to play when the Navigation Timer expires (SPRM10 register). The value of SPRM9 register decreases by 1 each second.

When the value reaches 0 the PGC defined in SPRM10 plays. People skilled in the art recognize that other methods and techniques can be used to implement a similar time out feature: e.g. the menu is played back in loop mode, the menu loops N times before the timeout takes place, the timeout duration equals N times the duration of one loop.

The display of the Selections DVD Menu can be set to expire after a defined interval. If the customer does not press any button in time, the playback of the info kiosk movie begins automatically after the timeout.

We will now discuss the interfacing method based on Control Movies used in the delayed vending scenario, and in particular for signaling an item selection.

The number of Control Movies equals the number of dispensable items on the cabinet. E.g. the Control Movie for beverage Drink1 triggers the VMC to dispense Drink1. The Control Movie for beverage Drink2 triggers the VMC to dispense Drink2. The Control Movie can show a message "Item released" to indicate to the customer that the selected item will be dispensed very soon.

At least two types of Control Movies can be used:

In one embodiment of this invention, we make use of Control Movies with special video content hereinafter referred to as "Video Control Movies".

Sensors in optical sensor unit 109 are mounted on top of a reserved area of the LCD screen 108 in the vending machine cabinet, where each sensor senses its own reserved rectangular area on a specific location of the LCD screen area. Sensors can be mounted horizontally (top or bottom) or vertically (left or right). Other variations to mount the sensors are of course possible. Sensors detect whether a rectangular area on the LCD screen 108 is white or black.

The white and black rectangles are rendered video bitmaps in the video stream. The Video Control Movie footage is rendered in a specific way so that a combination of black and white rectangles is shown on the locations that are monitored by the mounted sensors. The number of rectangular areas (either black or white) equals the number of sensors on the cabinet. There should be enough distance in between the rectangular areas to avoid incorrect activation.

Since the optical sensors 109 are operational during the entire vend transaction, it is important that the sensors can only be activated by the specially rendered Video Control Movies. The LCD region covered by sensors (whether mounted horizontally or vertically) should always stay black during playback of a video clip, as it should not activate any mounted sensor. Therefore video clips should be resized to fit in the allowed screen region, so that the video content never overlaps the sensor area (stays black).

In one embodiment of this invention N optical sensors 109 are mounted on top of a reserved area of the LCD screen 108 in a vending machine cabinet that can dispense N items. In this embodiment the actual item/beverage selection is represented in the Video Control Movie as a combination of N rectangular areas where 1 rectangle is white (rectangular area corresponding with the selected item/beverage) and the other N−1 rectangles are black. The color white means "1" (dispense item), and the color black means "0" (do not dispense item).

Figure 18:
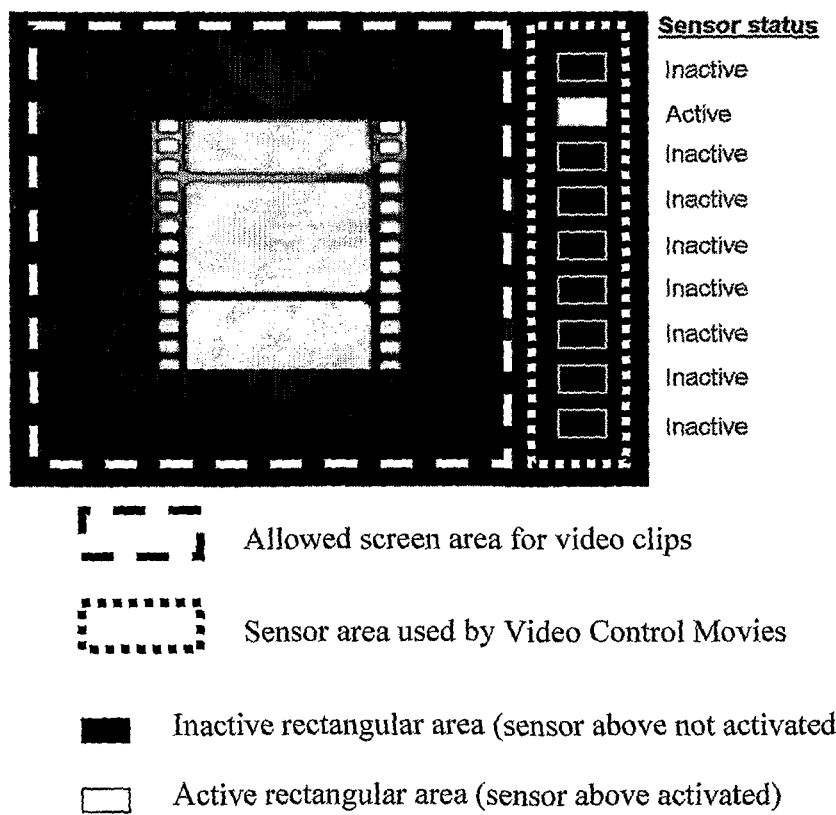
FIG. 18 shows a Screenshot of a Video Control Movie with sensor area

Each Video Control Movie is specifically mastered to show a white rectangle on a specific location X to activate sensor X, while all other N−1 rectangular areas are black. FIG. 18 shows a screenshot of a Video Control Movie with sensor area. FIG. 23 shows by way of example a table of items and corresponding screenshots of Video Control Movies that can be used in a vending cabinet in which 9 items/beverages are available.

In another embodiment of this invention M<N optical sensors 109 are mounted on top of a reserved area of the LCD screen 108 in a vending machine cabinet that can dispense N items. In this embodiment the actual item/beverage selection is represented in the Video Control Movie as a combination of M rectangular areas where each rectangular area can be either black or white. The color white means logical value "1", and the color black means logical value "0". The combination of white and black rectangles represent a binary encoded value between 1 and $2^M$ of the selected beverage/item that should be dispensed. Each Video Control Movie is specially mastered to show a combination of white and black rectangles that represent a binary encoded value corresponding to a specific item/beverage.

The sensor output (set of sensors) of optical sensor unit 109 will decode into the item/beverage selection. By way of example, for a vending cabinet in which 9 different item/beverage selections are available, we need at least M=4 sensors to represent item/beverage selections between 1 and $2^4=16$. There will be 9 different Video Control Movies in total to represent item/beverage selections between 1 and 9.

In one embodiment of this invention, we provide methods and techniques to implement a solution without an extra microcontroller. In this solution, the sensor panel decoder of optical sensor unit 109 producing a decoded value between e.g. 0x01 and 0x09 (based on the activated sensor) is directly connected to the keyboard decoder 102 of the Vending Machine Controller 100.

In another embodiment of this invention, we provide methods and techniques to implement a solution with an extra microcontroller. In this solution, the sensor panel decoder of optical sensor unit 109 producing a decoded value between e.g. 0x01 and 0x09 (based on the activated sensor) is connected to the microcontroller 111.

People skilled in the art will recognize that in an alternative embodiment of this invention one could implement Video Control Movies that make use of subtitles for rendering the rectangular areas on the screen. In this example embodiment, the subtitles are rendered in such a way that the location of the subtitles corresponds to the location sensed by the optical sensor unit 109. People familiar with the DVD standard know that several subtitles (subpicture streams) can be used in one MPEG2 stream: One subpicture stream for each language. Different subpicture streams can be used for different languages. This makes it possible to use the same graphical user interface and the same Video Control Movies on different vending machines, offering the same items, but in a different order. The same DVD disc can be used for different vending machine configurations. When installing the DVD disc, the vending machine operator will select the proper subtitle language corresponding to the item order in the cabinet.

In another embodiment of this invention, we make use of Control Movies with special audio content hereinafter referred to as "Audio Control Movies".

For each item/beverage selection there is an associated Audio Control Movie which contains video footage in which a DTMF tone is multiplexed. A major advantage of this approach in contrast to Video Control Movies is the fact that there are no restrictions on the available screen area. There is no need to mount an optical sensor unit 109 on the LCD screen 108 when using Audio Control Movies instead of Video Control Movies. DTMF (Dual Tone Multiple Frequencies) tones are sounds used for touch tone dialing.

In DTMF there are at least 16 distinct tones. Each tone is the sum of two frequencies: one from a low and one from a high frequency group. For example DTMF tone number "1" is represented by the frequencies 697 Hz and 1209 Hz. The standard defines 16 different DTMF tones. FIG. 19 shows a table of frequency pairs for each DTMF tone.

We will use N Audio Control Movies—with each a unique DTMF tone—on a vending machine capable of dispensing N items. As the standard defines 16 DTMF tones N can be maximal 16, which is sufficient for most beverage/item vending machines. People skilled in the art know how to overcome this limitation in case the vending machine has more than 16 dispensable items. The audio output of the DVD player 106 is connected to a DTMF decoder 110 which can decode the audible sound produced by the Audio Control Movie. Most DTMF decoders decode the audible sound on an input pin and produce a decoded value between 0x0 and 0xF on a set of 4 output pins. An additional output enable pin on the DTMF decoder 110 becomes high when the audible sound is properly recognized as one of the 16 possible DTMF tones. One skilled in the art will recognize that other types of DTMF decoders exist on the market, that can be used as well in alternative embodiments of this invention.

In one embodiment of this invention, we provide methods and techniques to implement a solution without an extra microcontroller. In this solution, the DTMF decoder 110 is directly connected to the keyboard decoder 102 of the Vending Machine Controller 100. Playing out one of these DTMF tones (which corresponds to the beverage/item selection) is similar as pressing a button on the selection panel 101 of a traditional vending machine cabinet, in which the outer buttons are directly connected to the keyboard decoder 102 of the Vending Machine Controller 100.

In another embodiment of this invention, we provide methods and techniques to implement a solution with an extra microcontroller. In this solution, the DTMF decoder 110 is connected to the added microcontroller 111. Playing out one of these DTMF tones (which corresponds to the beverage/item selection) will signal the microcontroller that: 1) an item was selected when the microcontroller 111 is in input mode, or 2) the video information message or video clip has been played when the microcontroller 111 is in decision mode, and the item can be dispensed through a dispenser unit 105 when the vend is successful.

The example embodiments of this invention, using Audio Control Movies, do not detail which actual DTMF tones should be used for each Audio Control Movie. Although the invention does not take a stand as to which actual DTMF tones should be used for each Audio Control Movie special care should be taken when selecting the DTMF tone for a specific Audio Control Movie during the authoring process of said Control Movie. The choice of a DTMF tone is not free but subject to the interfacing setup between the DTMF decoder 110, and, either the keyboard decoder 102 of the vending machine controller 100, or the extra microcontroller 111. Playing back the Audio Control Movie for dispensing item X, should have the same effect as pushing the button for item X on the selection panel 101 of a traditional vending machine. This means that the DTMF tone present in the Audio Control Movie should be decoded as item X. A DTMF tone table, listing DTMF tones and corresponding beverage/candy/other item, should be consulted during the authoring process of Audio Control Movies.

DVD players come with both analog and digital audio outputs. Some DVD players even come with an integrated 5.1 surround sound decoder. Depending on the actual DVD player 106 in use, different audio connections are possible between the DVD player 106 and the speakers/DTMF decoder circuit 110 respectively.

In one embodiment of this invention (approach 1), the analog stereo outputs are connected to the DTMF decoder 110 and the speakers. Both the DTMF decoder 110 and the speakers can be connected to the analog stereo (Left/Right) audio outputs of the DVD player 106. The disadvantage of this approach is that the DTMF tones will be audible on the speakers mounted in the front panel of the cabinet.

In another embodiment of this invention (approach 2), one analog audio output (either Left or Right) is connected to the DTMF decoder 110, and the other analog output (either Right or Left) is connected to the speaker. The Audio Control Movies are mastered in such a way that the DTMF tones are produced only on one of the mono audio outputs (either Left or Right) of the DVD player 106. The advantage of this approach is that the DTMF tones are no longer audible on the cabinet speaker. The disadvantage of this approach is that the cabinet will only produce a mono sound as one of the analog stereo audio outputs is sacrificed for DTMF signaling between the DVD player 106 and the DTMF decoder 110.

In a further embodiment of this invention (approach 3), we will use the decoded 5.1 audio output on the DVD player 106. Using advanced tools it is possible to master the Audio Control movies with 5.1 surround sound. A DVD player 106 with integrated 5.1 surround sound decoder contains several analog audio outputs: Center, Left Front, Right Front, Left Rear, Right Rear and Subwoofer. In an example embodiment of this invention, the Front audio outputs could be connected to the speakers and the Rear audio outputs could be connected to the DTMF decoder 110. Special care should be taken when mastering the Audio Control Movies, to assure that only the Rear channels in the decoded 5.1 sound contain the DTMF tones. People skilled in the art will recognize that other channel configurations can be used. The advantage of this approach is that the DTMF tones are no longer audible on the cabinet speakers and that we can keep full stereo sound. The disadvantage of this approach is that 1) the DVD players with an integrated 5.1 decoder may be more costly than standard DVD players without an integrated 5.1 decoder, 2) the usage of 5.1 surround sound in the Audio Control Movies involves licensing costs and 3) the mastering process becomes more complicated and requires reasonably expensive tools to create 5.1 surround sound.

People skilled in the art will recognize that in an alternative embodiment of this invention one could implement Audio Control Movies that make use of several audio language streams. People familiar with the DVD standard know that several audio language streams can be used in one MPEG2 stream: One audio stream for each language. This makes it possible to use the same graphical user interface and the same Audio Control Movies on different vending machines, offering the same items, but in a different order. The same DVD disc can be used for different vending machine configurations. When installing the DVD disc, the vending machine operator will select the proper audio language corresponding to the item order in the cabinet.

People skilled in the art will recognize that the example embodiments of this invention presenting methods and techniques to use Video Control Movies or Audio Control Movies for passing item/beverage selection from the DVD player 106, to the keyboard decoder 102 of the Vending Machine Controller 100 or to the microcontroller 111 are just one of many example embodiments of this invention. It should be noted that alternative signaling could be used.

Alternative Video Control Movies: there are several modulation and demodulation techniques available to modulate and demodulate data on a video signal, e.g. closed caption, teletext, etc.

Alternative Audio Control Movies: there are several modulation and demodulation techniques available to modulate data on an audio signal, e.g. computer cassette audio interface, modulation techniques used in modem communications, etc.

It is intended that the invention covers all embodiments and variations thereof as long as such embodiments and such variations come within the scope of the appended claims and their equivalents.

Embodiments of this invention provide methods and techniques to implement the control logic of a random scratch card algorithm on a stand-alone consumer DVD player architecture.

Most consumer DVD players have a PSEUDO RANDOM number generator which can be used for random video clip selection. An instruction can be called to return a random value in a memory location (GPRM register on the DVD). The random number instruction supported by most DVD players is similar to the random number generator on computers based on a seed value. These algorithms are referred to as pseudo random number generators. Computer scientists know how pseudo random number generators work.

Although the random number instruction returns random values, the pseudo random number generator does not guarantee unique draws in a sequence of N draws for a random number between 1 and N. To make sure that all video clips are played in random sequence, and none of the video clips is repeated before all the other random video clips have been played, we will implement a scratch card algorithm to keep track of the movies that have been played already.

The scratch card algorithm uses the following technique:

If all movies have been played from the set (=all the flags are set on the scratch card) the scratch card will be flushed (=all flags will be cleared on the scratch card).

The random draw selects a random video clip and checks the corresponding flag on the scratch card. Two scenarios are possible (A or B)

(A) If the flag was not set, the random draw is considered valid.

The movie is played and the corresponding flag will be set.

(B) If the flag was set, the random draw is considered invalid. A new random draw will take place.

The algorithm for implementing the scratch card consists of a number of instructions. As mentioned before instructions coded on a DVD disc must be placed in either a pre/post statements section of a DVD Menu/Movie object. Using jump statements a list of instructions can be split over several DVD Menu/Movie objects to overcome the maximum amount of possible consecutive instructions in one pre/post statements section if necessary.

In order to implement the scratch card algorithm we will use Program Instruction DVD Movie objects. These Program Instruction DVD Movie objects have pre/post statements sections in which we will put the instructions of our scratch card algorithm. A DVD Movie object that has a pre/post statements section containing instructions of our algorithm is hereinafter referred to as a PIM object (Program Instruction Movie object). The PIM objects can have actual video content, but this is of no interest to the implementation of our scratch card algorithm. For practical implementation of the algorithm one can use a short movie sequence, which is not visible when the DVD player 106 jumps to the PIM object and executes the actual instructions of the scratch card algorithm.

In case the algorithm is split over N PIM objects, the complete code of the scratch card algorithm can be executed by calling the first PIM object. Each PIM object will call the next PIM object after its own code has been executed: PIM object i executes its own code and jumps to PIM object i+1. The post statements section of PIM object i contains a JUMP instruction to PIM object i+1.

Before we discuss the scratch card algorithm in detail, it is worth to highlight from where in our DVD application we will call the scratch card algorithm:

The customer selects through buttons on selection panel 101 an item/beverage in a graphical user interface using a Selections DVD Menu. When the item/beverage is selected by the customer, the corresponding button statements of the selected menu item in the Selections DVD Menu are executed. At this point we need to store the item/beverage selection in a free GPRM register, (e.g. value 1-9 corresponding to selected item 1-9), which we will use after the random video clip has been played. In order to play the random video clip we jump to the start of our scratch card algorithm: the first instruction in the pre statements section of our first PIM object.

In one embodiment of this invention, we provide methods and techniques to implement a solution without an extra microcontroller. In this embodiment we need to play the proper Control Movie (using a conditional jump) after the random video clip has been played, to instruct the VMC 100 to dispense the proper item which was initially selected by the customer in the Selections DVD Menu through a dispenser unit 105.

In another embodiment of this invention, we provide methods and techniques to implement a solution with an extra microcontroller. In this embodiment we need to play the proper Control Movie (using a conditional jump) on DVD player 106 to 1) signal the beverage/item selection to the microcontroller 111 after which the microcontroller 111 will decide to play a random video clip on the DVD player 106 if the vend was successful, or 2) signal the end of the random video clip to the microcontroller 111 and that the item can be dispensed through dispenser unit 105 when credit status is sufficient and item is available.

The scratch card algorithm should be clear from the foregoing description, however, we present here an example of the pseudo code for the sake of completeness. One skilled in the art will recognize, however, that the present invention also can be practiced without some of the specific details described herein, or with other specific details. Also, other steps could be implemented for each routine, and in different orders, and in different routines, yet still achieve the same functions for a random playback without possible repeats.

The scratch card algorithm is implemented by making use of several GPRM registers in the DVD player 106. Each GPRM register (16 bits wide) can be used to scratch (=keep track of) 16 movies.

The required number of GPRM registers to implement the scratch card algorithm is subject to the number of video clips from which one wants to make a random draw with no repeats. Since the scratch card algorithm makes use of internal DVD registers (GPRM registers)—which are limited to 16 in the current DVD standard—the number of random movie assets that can be managed on this scratch card is limited to a certain maximum. As the current DVD specifications only provide 16 GPRM registers there is a theoretical maximum of 16 [GPRMs]*16 [assets per GPRM]=256 [assets]. In practice this maximum amount is much lower, since some of the 16 GPRM registers are already used for internal purposes by DVD authoring tools or for other functionalities presented in embodiments of this invention. Note that this limitation is only based on the current specifications of the DVD standard. Future DVD/DVD-like (BlueRay, etc.) specifications might overcome this limitation.

By way of example: to handle a random draw of N=99 video clips, we need at least 7 GPRM registers to keep track of these 99 movies.

Figure 13:
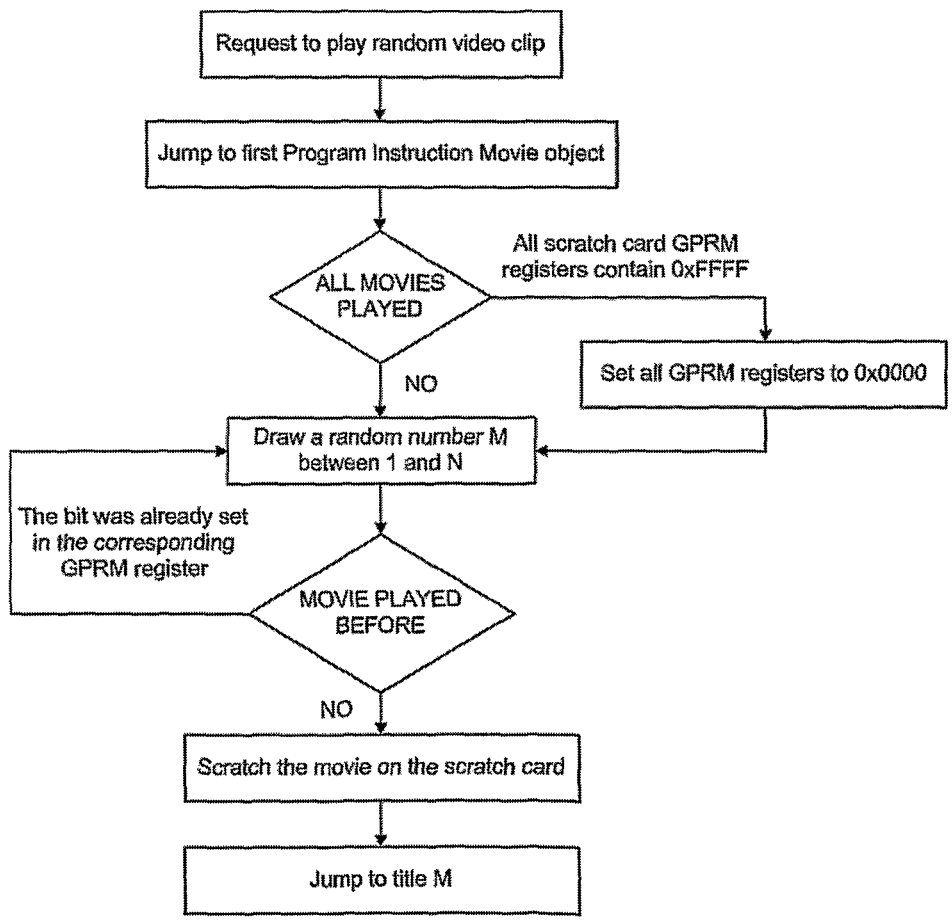
FIG. 13 is a Flowchart for the Scratch card algorithm

The following pseudo code suggests an implementation of the scratch card algorithm: A flowchart for the Scratch Card algorithm is shown in FIG. 13.

During initial boot of the DVD disc all GPRM registers are cleared to 0x0000.

When the DVD player 106 should play a random video clip, we will jump to the first PIM object which contains the start of our scratch card algorithm in the pre statements section.

In the pre statements section of this PIM object we check if ALL movies have been played, by checking all the scratch card GPRM registers. This condition is met when the value of every scratch card GPRM register equals 0xFFFF in hexadecimal notation. Note that we only consider GPRM registers specifically used in our scratch card algorithm.

If ALL movies have been played, we clear out all the GPRM registers, by setting each register to a hexadecimal value of 0x0000 to start all over again with an empty scratch card.

We draw a random number M between 1 and N using the PSEUDO RANDOM number generator. Using conditional statements (IF . . . THEN), instructions determine which GPRM register should be used to check and save the playback status of the movie from the random draw. FIG. 20 shows a table of Scratch card registers and corresponding movies. e.g. random draw M=42: We check playback status bit B9 in register GPRM3 The playback status of a video clip is stored in one bit position of a proper GPRM register. When the movie has not been played yet, the bit has a logical value of "0". When the movie has been played back, we will set the bit to a logical value of "1".

To check the playback status of the movie we check whether the corresponding bit in the proper GPRM register has been set. People skilled in the art of computer programming know that the status of a bit in a register can be checked by logically AND'ing the register with a bit mask in which all bits have the logical value "0" except the bit in particular which has logical value "1". E.g. To check bit B9 in register GPRM3, we will logically AND bit mask 0000001000000000b with register GPRM3, and check if the result is true.

When the bit is set, the movie was already played and we have to make a new random draw.

When the bit is not set, the movie was not played yet before, and the random draw is considered valid. We set the bit to scratch the movie. People skilled in the art of computer programming know that a bit can be set in a register by logically OR'ing the register with a bit mask in which all bits have the logical value "0" except the bit in particular which has logical value "1". E.g. To set bit B9 in register GPRM3, we will logically OR bit mask 0000001000000000b with register GPRM3.

After the bit has been set, the DVD player 106 will jump to the title M for play back of the video clip.

In one embodiment of this invention, we provide methods and techniques to implement a solution with an extra microcontroller circuit which is added for monitoring item availability and inserted amount of credit, to handle unsuccessful vends properly.

Figure 14:
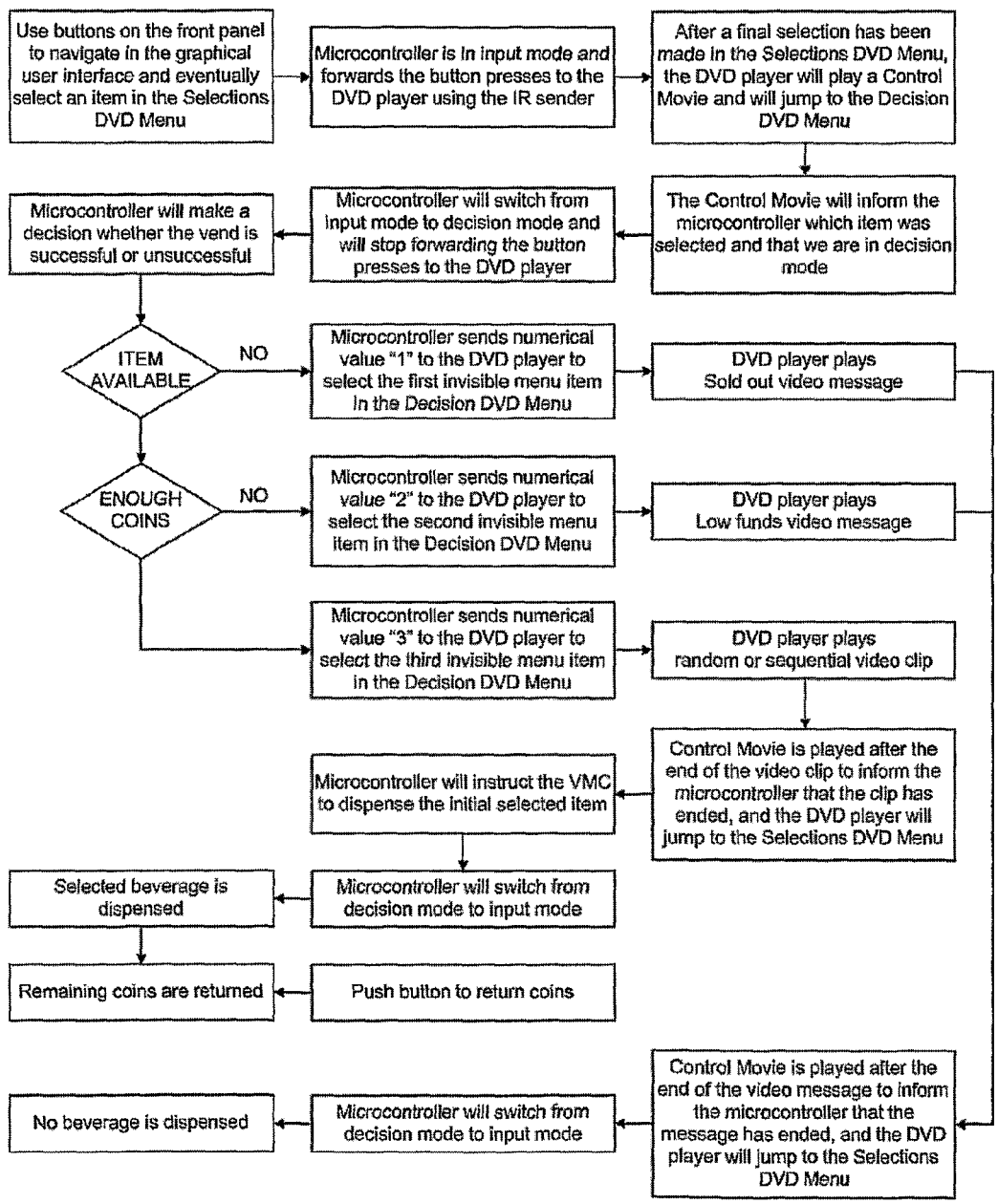
FIG. 14 is a Flowchart for the pseudo code to handle unsuccessful vends

In this embodiment, the pseudo code of both the DVD program instructions and the microcontroller program to handle unsuccessful vends could look like the pseudo code described below. A flowchart for the pseudo code to handle unsuccessful vends is shown in FIG. 14. One skilled in the art will recognize that enhancements or alterations may be made to the pseudo code below, yet still achieve the purposes described herein:

Instead of playing the video clip up front, both for successful vends and unsuccessful vends, the microcontroller 111 will make the decision to either 1) instruct the DVD player 106 to play a "sold out" video message when the beverage/item is no longer available, or 2) instruct the DVD player 106 to play a "low funds" video message when the customer did not insert enough credit, or 3) instruct the DVD player 106 to play a random/sequential video clip when the vend was successful. The information video messages and the video clips are played on DVD player 106, connected to LCD screen 108.

Figure 27:
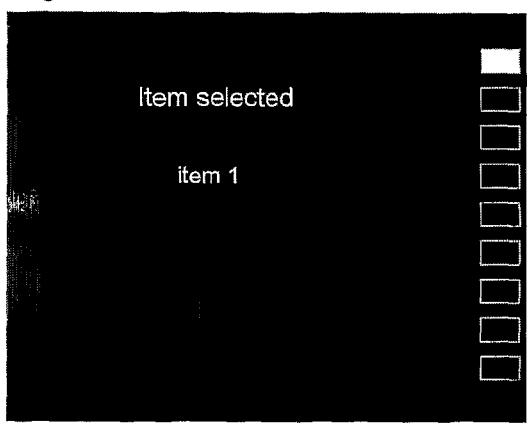
FIG. 27 shows a Screenshot of a Video Control Movie to signal that Item 1 is selected

When a selection is made from a Selections DVD Menu, the DVD player 106 will play a proper Control Movie to signal the selected item to the microcontroller 111 and the DVD player 106 will jump from the Selections DVD Menu to a unique Decision DVD Menu. FIG. 27 shows a screenshot of a Video Control Movie to signal that item 1 is selected.

The Decision DVD Menu contains 3 invisible menu items: 1) "Sold out" menu item button, 2) "Low funds" menu item button, 3) "Vend successful" menu item button. Once the Decision DVD Menu is active, the DVD player 106 will wait for the actual decision from the microcontroller 111, which will send an IR command through the IR sender 114. The microcontroller 111 can decide whether the vend was successful or unsuccessful and based on this decision send one IR command to activate one of the 3 invisible menu items. In a DVD Menu structure up to 9 menu items on the screen can be selected by pushing an absolute numerical button (between button "1" and button "9") on the Remote Control Unit 107.

For the 3 invisible menu items in the Decision DVD Menu any 3 numbers between "1" and "9" are possible here. In an example embodiment of this invention we have selected the numerical buttons "1" to "3" for simplicity: 1) "Sold out" menu item button, 2) "Low funds" menu item button, 3) "Vend successful" menu item button. One skilled in the art will appreciate that other variations are possible. To increase stability, a timeout could be implemented in all Decision DVD Menus, which will return to the Main Selections DVD Menu after playing an "error" video message on the screen when no hidden menu item selection is made within a certain time interval.

Figure 28:
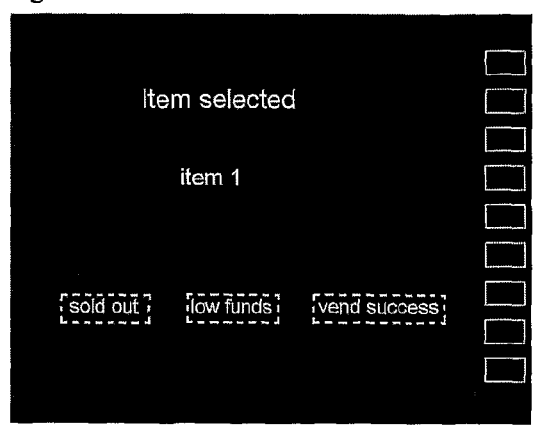
FIG. 28 shows a Screenshot of a Decision DVD Menu for Item 1 with 3 invisible buttons

For each of the beverage/item selections (which were selected in the Selections DVD Menu) there is a unique Decision DVD Menu. In an example embodiment of this invention, the background picture in the Decision DVD Menu could indicate "Item selected" and the selected Beverage/Item. An example of the Decision DVD Menu for Item 1 with 3 invisible menu items is shown in FIG. 28. The 3 dashed borders indicate that this Decision DVD Menu includes 3 invisible menu items: 1) "Sold out" menu item button, 2) "Low funds" menu item button, 3) "Vend successful" menu item button.

The hidden DVD Menu items should only be activated by the microcontroller 111 through the IR sender 114. The customer should not be able to activate the hidden DVD Menu items by pressing any buttons on selection panel 101 of the outer cabinet. This can be easily solved as follows:

The microcontroller 111 can operate in 2 modes, each serving another purpose:
1) Input mode: As long as the customer did not make an actual item/beverage selection in the graphical user interface, the microcontroller 111 will pass on button presses on the selection panel 101 of the vending cabinet to the DVD player 106 by translating each button press to an appropriate IR command corresponding to a proper button on the DVD Remote Control Unit 107 through IR sender 114. While the microcontroller 111 is in Input mode, the customer can navigate in the graphical user interface for making a beverage/item selection.

2) Decision mode: After the customer made an actual beverage/item selection in the graphical user interface, the microcontroller 111 will check if the vend can be approved, and send its decision to the DVD player 106 through the IR sender 114 (=the microcontroller 111 activates a hidden menu item in the Decision DVD Menu). While the microcontroller 111 is in decision mode, the microcontroller no longer passes on button presses on selection panel 101 to DVD player 106.

After the vend transaction has been completed (either successful or unsuccessful) the DVD player 106 will return to the Selections DVD Menu and the microcontroller 111 will forward the input buttons from the selection panel 101 again. Navigation buttons on the selection panel 101 are active again, because they are passed on to the DVD player 106 through the IR sender 114 connected to the microcontroller 111.

In one embodiment of this invention, the microcontroller 111 monitors item availability by sensing the SOLD OUT LED's 113 on the vending machine. People skilled in the art of electronics know how to check the status of 9 LED's (or more) by adding the proper circuit and interface to the microcontroller 111. FIG. 3 shows the connection between SOLD OUT LED's and the microcontroller.

One skilled in the art will recognize that other methods and techniques can be used, yet still achieve the purposes described herein. Example: a number of modern vending machines (among machines equipped with spirals to hold products) contain lasers near the access door at the bottom to check the sold out status of a product. If a purchased item does not break the laser beam when falling, the vending machine attempts to make another dispense of the purchased item, usually up to 3 times to ensure that a product will fall. If this still does not occur, a sold out flag is set for the particular item.

Figure 30:
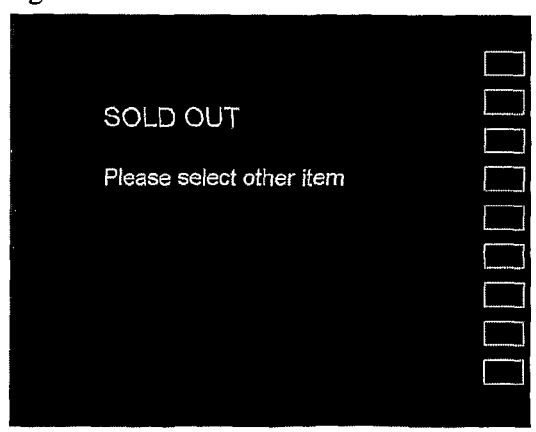
FIG. 30 shows a Screenshot of a Sold out Information Message Movie

The first invisible menu item can be activated in the Decision DVD Menu by sending through IR sender 114 the IR command corresponding to numerical button "1" on the RCU 107 to the DVD player 106. This will result in the playback of an information video message showing "Item Sold Out". FIG. 30 shows a screenshot of a Sold Out video message.

In another embodiment of this invention, the microcontroller 111 can check whether enough credit is available to complete a successful vend. Most traditional vending machines use a special communication protocol between the Vending Machine Controller 100 and the Coin Changer 103 and/or Bill Validator.

In vending machines, there are two functional architectures in wide use:
Multi-Drop Bus/Internal Communication Protocol (MDB) and Executive. These architectures are specified in the Vending Industry Data Transfer Standard (VI DTS)

The MDB interface provides a Master-Slave arrangement where all peripherals are Slaves to a Master controller. It is used to standardize vending machines that employ electronic control (traditionally known as vending mechanism controller VMC) so that all vending and peripheral equipment communicates identically. In general, there is one Master with capability of communicating with up to 32 peripherals. The Master is defined as the Vending Machine Controller (VMC). Each peripheral is assigned a unique address and command set. The master will "poll" the bus for peripheral activity. That is, each peripheral is asked for activity, and responds with either an, acknowledgement, negative acknowledgment, or specific data dependent on its current activity. If a peripheral does not respond within a predefined time it is assumed that it is not present on the bus.

The Executive system differs from the MDB system in that, peripheral devices such as payment instrument units, operate as a deciding unit (Master), and the rest of the vending machine operates as a sub unit (Slave).

In one embodiment of this invention, a conversion circuit 112 is used which converts the MDB protocol to the RS232 serial data protocol, so that the microcontroller 111 can monitor the MDB communication between an MDB Coin Changer 103 and the Vending Machine Controller 100 and gets informed when coins are inserted into the vending machine. Serial data protocols can be easily monitored by a microcontroller. FIG. 3 shows the circuit that converts the MDB protocol to the RS232 serial data protocol.

People skilled in the art will appreciate that the microcontroller 111 can also monitor the MDB communication between an MDB Bill Validator and the Vending Machine Controller 100, so that the microcontroller gets informed when bills are accepted in the vending machine. People skilled in the art will appreciate that other protocols can be handled as well, as long as the microcontroller 111 can monitor and interpret the data communication between the VMC 100 and the coin changer 103 and/or bill validator or any other payment devices.

By monitoring coin insertions and/or bill insertions on the background, the microcontroller 111 can keep track of the total inserted amount of credit. With this information the microcontroller 111 can check if the available credit is greater than or equal to the item price stored in an internal table and decide whether the vend can be successfully completed.

Figure 31:
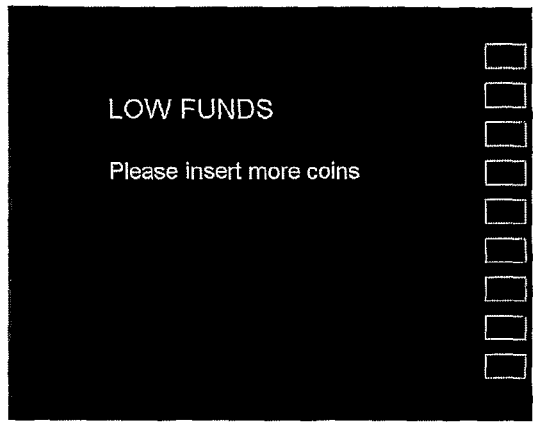
FIG. 31 shows a Screenshot of a Low funds Information Message Movie

The second invisible menu item can be activated in the Decision DVD Menu by sending through IR sender 114 the IR command corresponding to numerical button "2" on the RCU 107 of the DVD player 106. This will result in the playback of an information video message showing "Low Funds". FIG. 31 shows a screenshot of a Low Funds video message.

If the item is still available and enough funds are available, the vend is considered successful and the microcontroller 111 will send through IR sender 114 the IR command corresponding to numerical button "3" on the RCU 107 of the DVD player 106 to activate the third invisible menu item in the Decision DVD Menu. This will result in the playback of a random/sequential video clip.

The post statements sections of the "sold out" video message, the "low funds" video message and each video clip contain an instruction to jump to a subroutine that will playback a specific Control Movie to 1) indicate to the microcontroller 111 that the information video message or video clip has been played, 2) instruct the microcontroller 111 to signal the initial selected item to the keyboard decoder 102 of the VMC 100 if the vend was successful, and 3) that the microcontroller 111 should switch back from decision mode to input mode.

As a result the initial selected item will be dispensed after the video clip has been played back when the vend was successful.

After playing the Control Movie, the DVD player 106 will jump back to the proper Selections DVD Menu. The customer can navigate again in the Selections DVD Menu as the microcontroller 111 is in input mode again, making a new vend scenario possible.

We already discussed means to play video clips on the DVD player 106 in either sequential or random order using algorithms implemented by DVD instructions located in pre/post statements sections of PIM objects.

Figure 11:
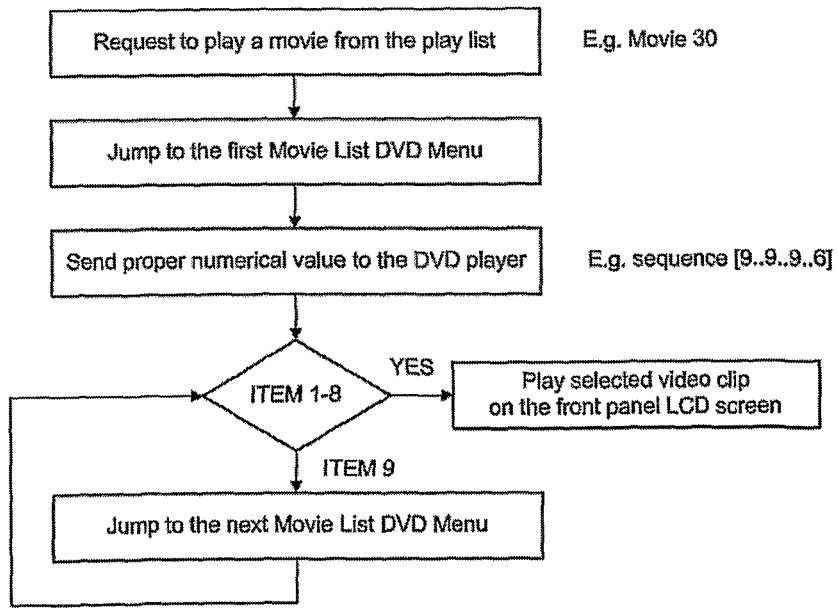
FIG. 11 is a Flowchart for Clip selection from a play list on the microcontroller

In another embodiment of this invention, the microcontroller 111 could select the video clip from a play list, to allow more complex sequences compared to the random/sequential sequence generated on the DVD player 106. A flowchart for clip selection from a play list on the microcontroller is shown in FIG. 11.

The microcontroller 111 can navigate through all the available movies on the DVD disc, once the DVD player 106 jumped to a Movie List DVD Menu. By limiting the number of entries in each Movie List DVD Menu to 9 entries, the microcontroller 111 can make absolute menu item selections in the DVD Menu by sending through IR sender 114 IR commands for numerical RCU buttons between "1" and "9" to the DVD player 106.

When the DVD player 106 presents a Movie List DVD Menu, the microcontroller 111 can send through IR sender 114 an IR command for a numerical button between "1" and "8" to select a movie within the current Movie List DVD Menu or the IR command for numerical button "9" to move on towards the next Movie List DVD Menu. When using IR commands for numerical buttons between "1" and "9", a Movie List of N titles can be made accessible by implementing a set of (N/8) DVD Menus where each DVD Menu has 8 menu items to play 8 movies and the $9^{th}$ menu item jumps to the next DVD Menu which has another set of 8 menu items to play the next 8 movies in the play list. Each Movie List DVD Menu [i] incorporates a menu item that can be activated with the IR command for numerical button "9" to jump to Movie List DVD Menu [i+1]. FIG. 21 shows a table of Movie entries in the Movie List DVD Menus.

Figure 32:
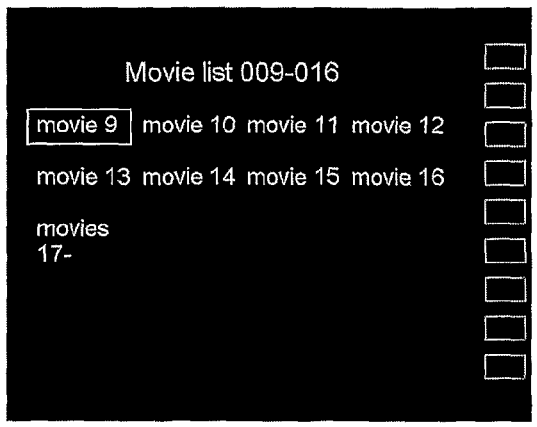
FIG. 32 shows a Screenshot of Movie List DVD Menu 2

FIG. 32 shows a screenshot of Movie List DVD Menu 2. This Movie List DVD Menu 2 contains menu items to play movie 9-16 and jump to Movie List DVD Menu 3.

Following this approach the microcontroller 111 can instruct the DVD player 106 to playback any movie number from the play list by sending a sequence of IR commands through IR sender 114 to the DVD player 106. Example: To play back movie 30, the following IR sequence should be sent: "9", "9", "9", "6", resulting in the following actions on the DVD player 106:
1) Jump from Movie List DVD Menu 1 to Movie List DVD Menu 2
2) Jump to Movie List DVD Menu 3
3) Jump to Movie List DVD Menu 4
4) Jump to movie 30

Note that this approach can be used to implement the random video clip selection with scratch card algorithm on the microcontroller 111. In this case the entire algorithm would be implemented in program code running on the microcontroller 111 instead of program instruction code on the DVD player 106. Since microcontrollers generally do not have the technical limitations as present in a DVD player, e.g. limited memory locations, larger scratch cards can be implemented.

Alternative approaches can be used for navigating through all the available movies on the DVD disc. FIG. 22 shows a table of alternative Movie entries in the Movie List DVD Menus. One skilled in the art will recognize that the methods and techniques presented here are just some examples of how a microcontroller 111 can play any movie out of a play list by sending an IR command sequence through an IR sender 114 to the DVD player 106.

Having discussed methods for implementing a graphical user interface based on DVD Menu structures, and implementing a delayed vending scenario, based on interfaces between a DVD player 106, an optional microcontroller 111, the keyboard decoder 102 of the Vending Machine Controller 100, we will now present techniques and methods to further improve the presented graphical user interface with a functionality to show credit status on the LCD screen 108 connected to the DVD player 106.

In one embodiment of this invention, we can use the background image of the Selections DVD Menu to indicate the current amount of inserted credit. People skilled in the art will appreciate other means for representing the actual credit status on the screen. One could use an OSD (On Screen Display) module connected to the microcontroller 111 and the video signal to superimpose a counter on top of the main screen 108.

Figure 33:
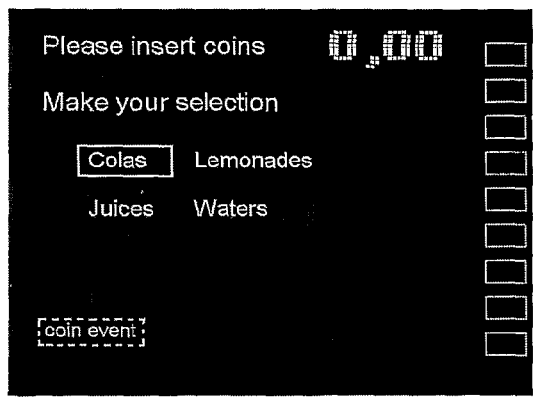
FIG. 33 shows a Screenshot of a background image in the Main Selections DVD Menu

In an example embodiment of this invention, the current amount of inserted credit can be indicated by a numerical counter in the background image of the Selections DVD Menu. Initially the Selections DVD Menu should indicate an inserted credit amount of 0 (Main Selections DVD Menu). FIG. 33 shows a screenshot of a background image in the Main Selections DVD Menu, indicating a credit amount of 0.

The methods and techniques following are based on monitoring coin insertions in a coin changer 103. People skilled in the art will recognize that similar methods can be used for monitoring bill insertions on a vending machine.

The coin changer 103 of a vending machine accepts a number of different coin types:

E.g. vending machines in the European Union accept at least one or more of the following coin types: 1) 5 eurocent, 2) 10 eurocent, 3) 20 eurocent, 4) 50 eurocent, 5) 1 euro, 6) 2 euro.

E.g. vending machines in the Unites States accept at least one or more of the following coin/bill types: 1) nickel (5 cent), 2) dime (10 cent), 3) quarter (25 cent), 4) dollar We will use the following terminology in the text describing this invention:
Cmin=the accepted coin type with the lowest coin value (e.g. 5 eurocent)
Cmax=the accepted coin type with the highest coin value (e.g. 2 euro)

In most cases, the amount of money inserted in a vending machine is a multiple of Cmin. E.g. in the Multi-Drop Bus (MDB) standard, the Coin Changer device is configured to accept coin types where each coin value is evenly divisible by a Coin Scaling Factor.

The highest coin value Cmax is in most cases greater than or equal to the item price.

Within the MDB standard, the VMC controller will issue a coin acceptance disable command when the inserted amount of coins is greater than the highest item price of products in the vending machine. The controller will allow acceptance of all coins as long as the accumulated credit is equal to or less than the maximum price of any selection in the vending configuration.

Figure 34:
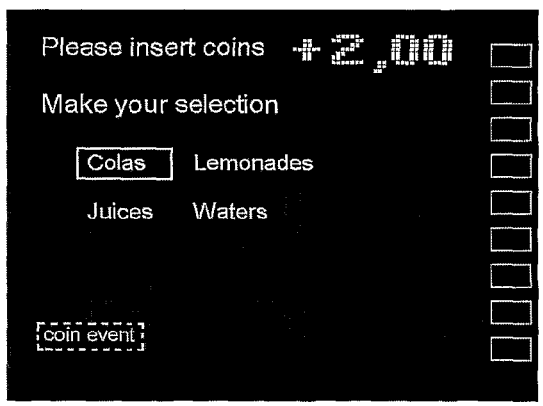
FIG. 34 shows a Screenshot of a duplicate Selections DVD Menu with credit value "+Cmax"

FIG. 24 shows a table of bitmaps to represent any possible credit amount between 0 and Cmax=2 euro. For simplicity we will represent any credit amount greater than Cmax with one bitmap image indicating "+Cmax" as in FIG. 34. Additional bitmaps could be optionally added to represent credit amounts greater than Cmax.

Figure 35:
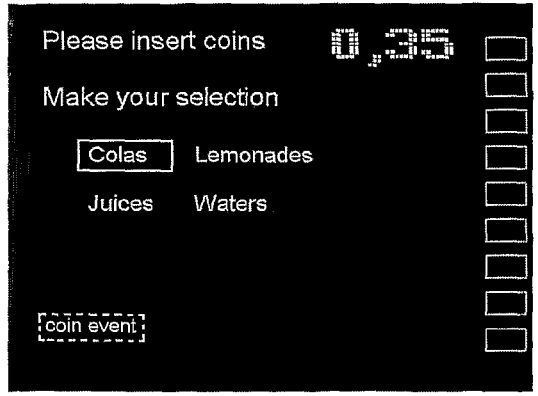
FIG. 35 shows a Screenshot of a duplicate Selections DVD Menu with credit value 35 eurocent

We will need to duplicate the Selections DVD Menu several times as we will use the background image of the Selections DVD Menu to indicate the current amount of inserted credit. Each duplicated Selections DVD Menu is exactly the same as the Main Selections DVD Menu—same beverage/item selections—with the exception of the background image. For each Selections DVD Menu, the background image indicates one coin value more than the previous Selections DVD Menu. An example of the duplicate Selections DVD Menu which corresponds to 35 eurocent can be found in FIG. 35. (35 eurocent=7 multiples of the lowest possible coin value of 5 eurocent)

When the customer inserts a certain coin type in the coin changer 103 of the vending machine, the DVD player 106 should jump from the current Selections DVD Menu—indicating credit value X in the background image—to another Selections DVD Menu—indicating credit value (X+coin value of inserted coin type) in the background image.

We will provide proper means to handle coin insertions in coin changer 103 and jump from one Selections DVD Menu to another Selections DVD Menu on the DVD player 106, where each Selections DVD Menu always shows the current credit amount in the background image.

This functionality can be provided by adding an invisible menu item to each Selections DVD Menu which will bring us to a Coin Insertion DVD Menu in which we can inform the DVD player 106 which coin type exactly was inserted in the coin changer 103 of the vending machine and based on this inserted coin value jump back to a new Selections DVD Menu with an updated background image on the DVD player 106.

One skilled in the art will recognize that we can also add an additional invisible menu item to each Selections DVD Menu which will bring us to a Bill Insertion DVD Menu in which we can inform the DVD player 106 which bill type exactly was inserted in the bill validator of the vending machine and based on this inserted bill value jump back to a new Selections DVD Menu with an updated background image on the DVD player 106.

One skilled in the art will recognize that there are many ways to handle coin and bill insertions and that the example embodiment is only illustrative.

It should not be possible for the customer to activate a hidden coin insertion menu item by pressing any button on the selection panel 101. Only the microcontroller 111 should be able to activate this hidden coin insertion menu item in the Selections DVD Menu. To prevent that the customer can activate the hidden menu item to handle coin insertions, we have to make sure that 1) the numerical values for absolute item selection produced by the customer when pressing a button on the selection panel 101 are different from the numerical value for selecting the hidden menu item, 2) the hidden menu item is not part of the menu items navigation list.

Figure 15:
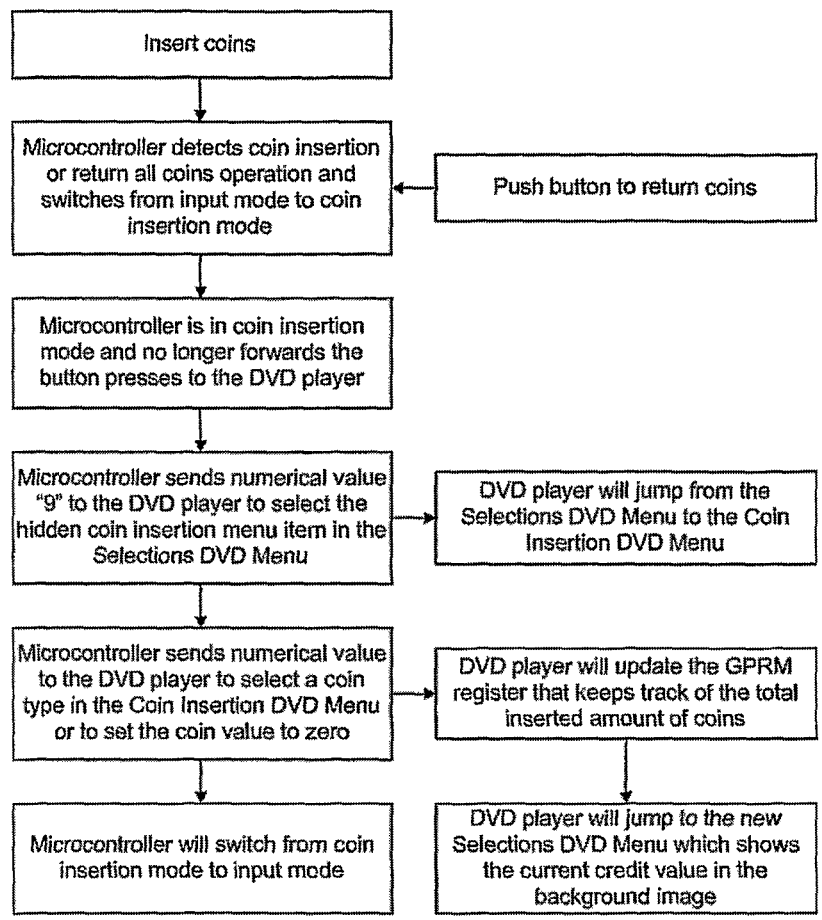
FIG. 15 is a Flowchart for the pseudo code to handle coin insertions

In an example embodiment of this invention, the pseudo code of both the DVD program instructions and the microcontroller program to display credit values on the LCD screen 108, could look like the pseudo code described below. A flowchart for the pseudo code to handle coin insertions is shown in FIG. 15. One skilled in the art will recognize that enhancements or alterations may be made to the pseudo code below, yet still achieve the purposes described herein.

When the microcontroller 111 has detected that the customer inserted a coin in coin changer 103 or that a return all coins operation was requested, it will switch from input mode to coin insertion mode and send through IR sender 114 the IR command corresponding to the proper numerical value to the DVD player 106 to activate the hidden menu item in the Selections DVD Menu and jump to the Coin Insertion DVD Menu.

Once the microcontroller 111 has switched from input mode to coin insertion mode, it will no longer pass on button presses on the selection panel 101 and translate them to IR commands.

Once the Coin Insertion DVD Menu is active, the DVD player 106 will wait for input from the microcontroller 111 through the IR sender 114. Based on the inserted coin type or the difference between the previous accumulated credit and the current accumulated credit, the microcontroller 111 will activate one of the menu items in the Coin Insertion DVD Menu to signal to the DVD player 106 which coin type/extra credit has been inserted by the customer. This menu can also be used to reset the credit value to 0 in case of a return all coins operation.

The microcontroller 111 will send either one of the following IR commands through IR sender 114:
1) IR command corresponding to menu item button "1": 5 eurocent,
2) IR command corresponding to menu item button "2": 10 eurocent,
3) IR command corresponding to menu item button "3": 20 eurocent,
4) IR command corresponding to menu item button "4": 50 eurocent,
5) IR command corresponding to menu item button "5": 1 euro,
6) IR command corresponding to menu item button "6": 2 euro,
7) IR command corresponding to menu item button "7": Reset coin value to 0.

Figure 37:
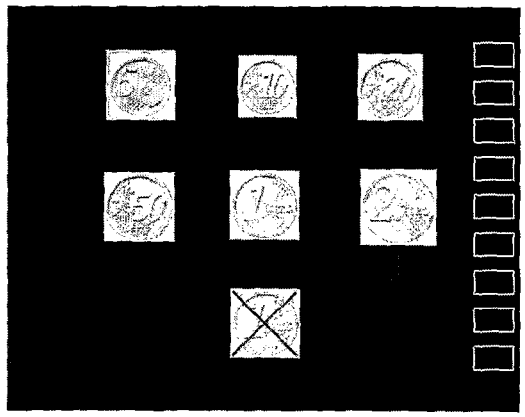
FIG. 37 shows a Screenshot of a Coin Insertion DVD Menu

FIG. 37 shows a screenshot of a Coin Insertion DVD Menu. Other coin currencies can be handled as well with another Coin Insertion DVD Menu. (e.g. dollar coin values: 1) nickel (5 cent), 2) dime (10 cent), 3) quarter (25 cent), 4) dollar, 5) Reset coin value to 0.)

Each time a selection has been made in the Coin Insertion DVD Menu, the DVD player 106 executes instructions in the button statements section of the selected menu item. These instructions perform the following actions: 1) a specific GPRM register will be updated to remember the total inserted amount of coins/accumulated credit, and 2) the DVD player 106 will jump to another Selections DVD Menu—indicating current inserted credit amount (X+coin value of inserted coin type) in the background image.

The DVD player 106 needs to remember the total inserted amount of coins/accumulated credit, so that in case an item selected by the user is no longer available or there are not enough funds, the DVD player 106 will jump back to the proper Selections DVD Menu in which the background picture should indicate the current amount of inserted coins/accumulated credit. The customer can make a new selection in the proper Selections DVD Menu in case previous selected item was sold out or insert more coins/credit in case funds were not sufficient.

The additional effort to display credit values in the background image of the Selections DVD Menu will make it possible to check funds on the DVD player 106 instead of on the microcontroller 111.

Figure 16:
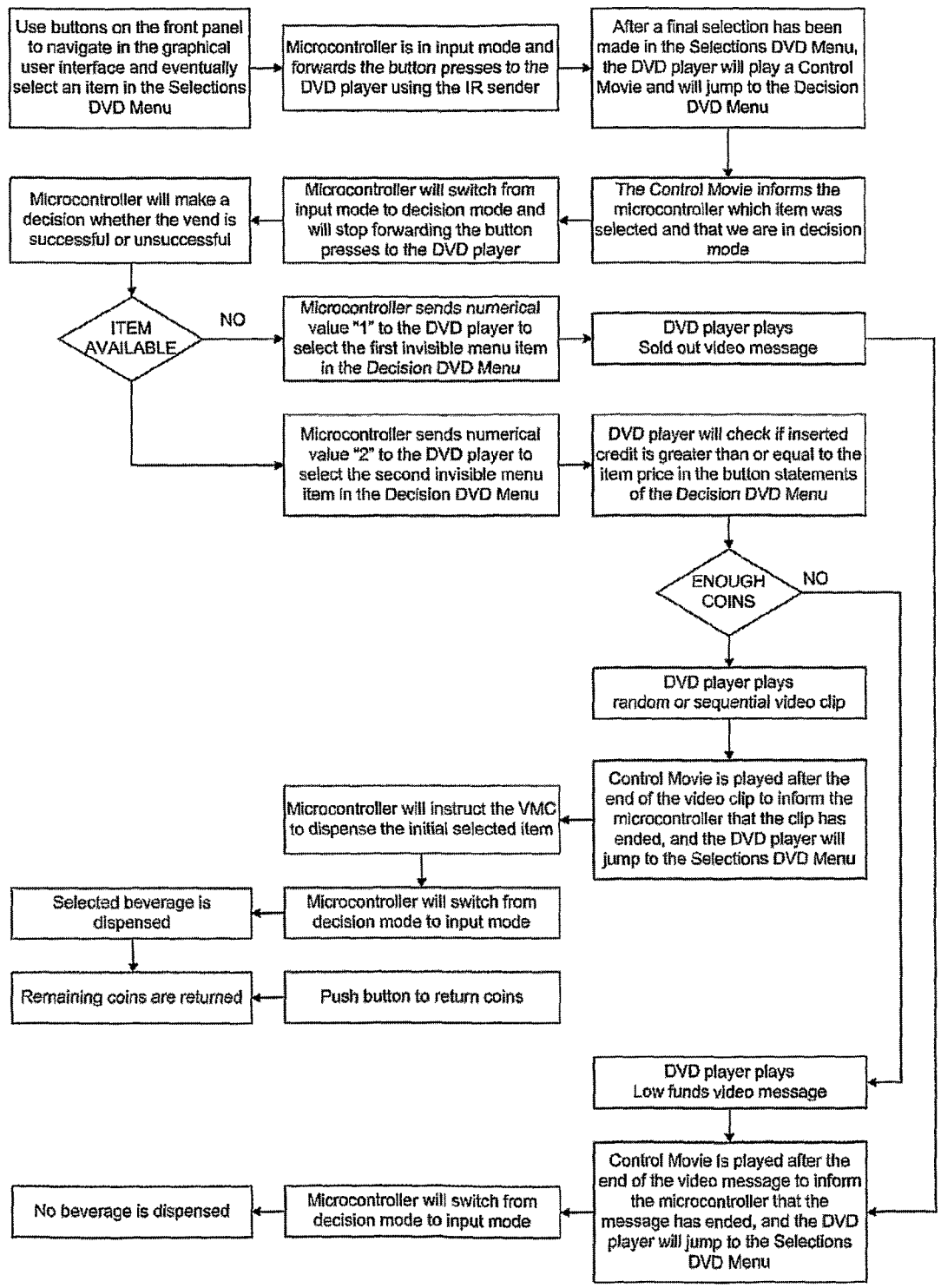
FIG. 16 is an Alternative Flowchart for the pseudo code to handle unsuccessful vends

In a further embodiment of this invention, the credit status can be checked on the DVD player 106 instead of on the microcontroller 111. An alternative flowchart for the pseudo code to handle unsuccessful vends is shown in FIG. 16.

The Decision DVD Menu will only contain 2 invisible menu items:
1) menu item "1" to play a "sold out" video message when the beverage/item is no longer available
2) menu item "2" to perform credit check on the DVD player 106

Figure 29:
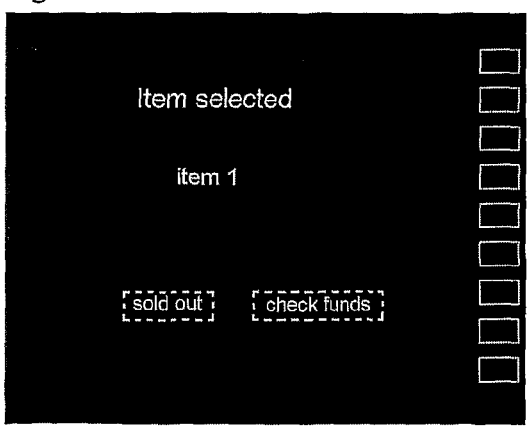
FIG. 29 shows a Screenshot of a Decision DVD Menu for Item 1 with 2 invisible buttons

An example of the Decision DVD Menu for Item 1 with 2 invisible menu items is shown in FIG. 29.

When the microcontroller 111 has activated menu item "2" in the Decision DVD Menu, the DVD player 106 can check in the button statements section of this menu item whether the inserted amount of credit is greater than or equal to the item price. In case the total amount of inserted credit is smaller than the item price, the DVD player 106 will play a "low funds" video message. In case the customer did insert enough credit the DVD player 106 will play a random/sequential video clip. After the information video message or video clip has been played, the DVD player will play a Control Movie to signal the microcontroller 111 that the clip has been played and that the initial selected item can be dispensed through the dispenser unit 105 when the vend was successful.

The microcontroller program will only have to monitor the coin insertions on the background—to activate the Coin Insertion DVD Menu—and should not keep track of the total inserted amount of credit any longer. There is no need to store an internal table with item prices on the microcontroller 111. Item prices can be hard coded in the DVD program instructions on the DVD disc in the DVD player 106—which check if the total inserted amount of credit is greater than or equal to the item price—at the time of authoring the DVD disc.

Having discussed basic interfacing methods between the DVD player 106 and the microcontroller 111, we will now discuss a more advanced communication method between the DVD player 106 and the microcontroller 111.

The previous methods and techniques of Control Movies can be used to signal a byte command and proceeding parameters from the DVD player 106 to the microcontroller 111. In a Video Control Movie one can represent a byte by using 8 rectangular areas on the screen. To inform the microcontroller 111 that the optical sensor unit 109 should be read, a $9^{th}$ rectangular area can be used. When the $9^{th}$ rectangular area flashes from black to white, the microcontroller 111 will detect an incoming byte and reads out the byte value by decoding the 8 sensors of the optical sensor unit 109. Each rectangular area can be either a black or white rectangle representing the two logical values of a bit: black represents logical value "0", white represents logical value "1".

The actual decoding of sensors in the optical sensor unit 109 by the microcontroller 111 can be implemented in different ways. People skilled in the art realize that one of the possible variations is a sensor block that decodes 8 sensor values in to a byte connected to an input port of the microcontroller 111. The sensor used to signal the incoming byte can be connected to the interrupt decoder of the microcontroller 111.

In total there can be 2"8=256 different Video Control Movies each representing a unique value between 0 and 255. Instead of sending the byte using one Video Control Movie other approaches are possible, e.g. the byte could be split in 2 parts of 4 bits, for each 4-bit part we need a Control Movie with 4 rectangular areas, limiting the total amount of Video Control Movies to 16. In this case, a combination of 4 bits can be represented by one Control Movie and a combination of 8 bits (a byte) can be represented by two sequential Video Control Movies. In the extreme, one could use only two Video Control Movies, which represent a 1-bit value. These Video Control Movies contain 2 rectangular areas: one rectangular area represents the logical bit value and the other rectangular area is used for signaling the microcontroller 111 that a bit is available.

Using the described approaches above one can write a byte to the microcontroller 111 using the DVD player 106 by playing out a Video Control Movie. People skilled in the art appreciate that other video modulation/demodulation techniques are possible.

Instead of Video Control Movies, Audio Control Movies using DTMF tones could be used as well, but this would involve 2 consecutive DTMF tones. People skilled in the art appreciate that other audio modulation/demodulation techniques are possible.

Figure 38:
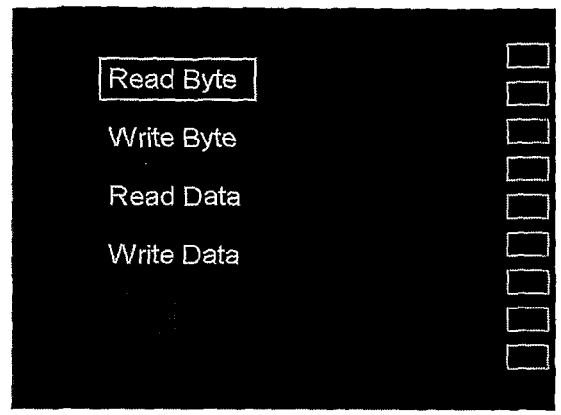
FIG. 38 shows a Limited command set for data exchange between the DVD player and MCU

The byte which gets signaled to the microcontroller 111 can represent a command code. The microprocessor 111 can read the byte as a command code and use the proceeding received bytes as arguments. In FIG. 38 we show a limited command set for exchanging data between the DVD player and the microcontroller.

The picture shows a DVD Menu with visible menu entries that are linked to the proper Video or Audio Control Movies. When one of the Control Movies (or a sequence) is played back by the DVD player 106 and detected by the microcontroller 111, the microcontroller 111 will execute the corresponding command. The list of commands is only illustrative, and by no means limited to the 4 presented commands. People skilled in the art recognize that DVD discs could be mastered with a specific set of command Control Movies for a specific microcontroller application.

After a command has been executed on the microcontroller 111, the microcontroller 111 can write a byte (or a sequence of bytes) back to the DVD player 106 through IR commands, sent through the IR sender 114. By sending back a proper sequence of IR commands, the microcontroller 111 can send binary data back to the DVD player 106.

Figure 39:
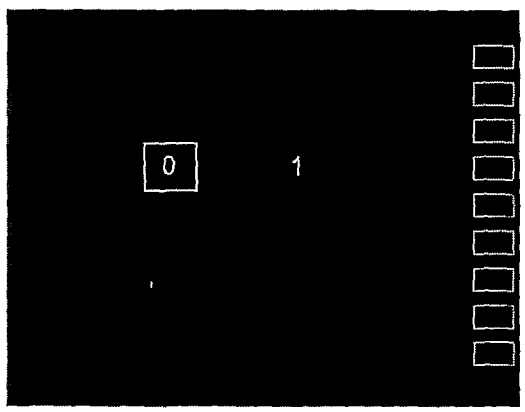
FIG. 39 shows a Screenshot of a Binary Input DVD Menu

The DVD player 106 which issued a command (with possible parameters) can wait for a response from the microcontroller 111 by entering a Binary Input DVD Menu. FIG. 39 shows a screenshot of a Binary Input DVD Menu.

After the DVD player 106 entered the Binary Input DVD Menu, the microcontroller 111 will send back IR commands through the IR sender 114, to activate either 1) menu item Bit "0" or 2) menu item Bit "1" in the Binary Input DVD Menu. To pass back a byte value, this Binary Input DVD Menu will be used 8 times.

Each time a selection has been made in the Binary Input DVD Menu, the DVD player 106 executes instructions in the button statements section of the selected menu item. These instructions can store the bit in a GPRM register and increase a counter to keep track of the total bit sequence. This way the DVD player 106 will either 1) jump again to the Binary Input DVD Menu to process remaining input or 2) jump to another DVD Menu or DVD Movie object when there is no remaining input to be processed. A timeout can be implemented in the Binary Input DVD Menu to handle errors.

We will demonstrate the two way interface between the DVD player 106 and the microcontroller 111 by explaining the first two memory read and memory write operations in the example command set.

The DVD player 106 can read a byte value V stored at address location A on the microcontroller 111 by sending the "Read Byte" command to the microcontroller. The DVD player 106 can send this command by playing out a Control Movie with the byte command corresponding to the "Read Byte" operation, resulting in the following steps:

1) The microcontroller 111 detects the command and will switch to "Read Byte" mode.
2) The DVD player 106 sends 2 consecutive bytes (in case we have a 16-bit address space) to the microcontroller 111 using Control Movies to indicate the byte location A from which the DVD player 106 wants to read an 8 bit value V.
3) The DVD player 106 will jump to the Binary Input DVD Menu.
4) The microcontroller 111 will read the value V of the byte at address location A
5) The microcontroller 111 will navigate properly through the Binary Input DVD Menu 8 times (each time sending the IR command for selecting either menu item 1 for bit "0" or menu item 2 for bit "1" through the IR sender 114) to pass back the byte value V.

6) The DVD player 106 can store the result in a GPRM register (either upper 8 bits or lower 8 bits) to use it at a later point in time.

The DVD player 106 can write a byte value V to address location A on the microcontroller 111 by sending the "Write Byte" command to the microcontroller. The DVD player 106 can send this command by playing out a Control Movie with the byte command corresponding to the "Write Byte" operation, resulting in the following steps:

1) The microcontroller 111 detects the command and will switch to "Write Byte" mode.
2) The DVD player 106 sends 2 consecutive bytes to the microcontroller 111 using Control Movies to indicate the byte location A in which the DVD player 106 wants to store an 8 bit value.
3) The DVD player 106 will send 1 byte to the microcontroller 111 using a Control Movie to indicate the 8 bit value V.
4) The microcontroller 111 will store the 8 bit value V at location A.

Optionally the memory write operation can be acknowledged by the microcontroller 111:

5) The DVD player 106 will jump to the Binary Input DVD Menu.
6) The microcontroller 111 will navigate through this menu 8 times (each time sending the IR command for selecting either menu item 1 for bit "0" or menu item 2 for bit "1" through the IR sender 114) to pass back an acknowledge byte.
7) The DVD player 106 can check the result to verify that the memory write operation was successful.

Using the interfacing method described above, one can extend the data storage space on a DVD player 106 from 32 bytes (16 internal GPRM registers) to the free data storage available on the microcontroller 111.

Figure 40:
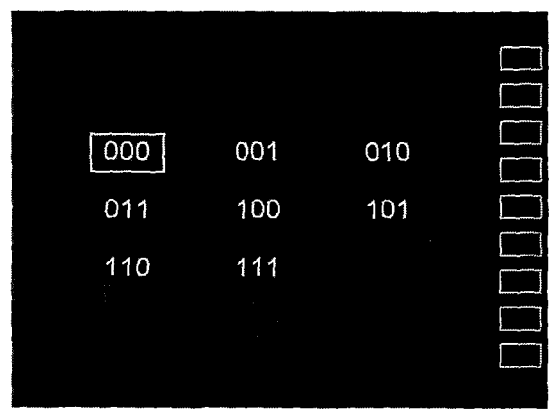
FIG. 40 shows a Screenshot of a Binary Burst Input DVD Menu

To pass back multiple bytes from the microcontroller 111 to the DVD player 106, an alternative Binary Burst Input DVD Menu can be used. FIG. 40 shows a screenshot of a Binary Burst Input DVD Menu.

The DVD player 106 which issued a command (with possible parameters) from which a multiple byte answer is expected can wait for a response from the microcontroller 111 by entering a Binary Burst Input DVD Menu. After entering the Binary Burst Input DVD Menu, the microcontroller 111 will send back IR commands through the IR sender 114 to activate menu items that correspond with one of the following bit sequences: 1) "000", 2) "001", 3) "010", 4) "011", 5) "100", 6) "101", 7) "110", 8) "111" in the Binary Burst Input DVD Menu.

To pass back N consecutive byte values, this Binary Burst Input DVD Menu will be used (N*8)/3 times. Each time a selection has been made in the Binary Burst Input DVD Menu, the DVD player 106 executes instructions in the button statements section of the selected menu item. These instructions can store the bits in a GPRM register and increase a counter to keep track of the total bit sequence. This way the DVD player 106 will either 1) jump again to the Binary Burst Input DVD Menu to process remaining input or 2) jump to another DVD Menu or DVD Movie object when there is no remaining input to be processed.

In the solution here we use absolute item selection in a DVD Menu by sending out the IR command for a numerical value between "1" and "9" through the IR sender 114. Relative item selection could be implemented as well by sending out IR commands for the arrow buttons. Using relative item selection, more than 9 menu item selections are possible within 1 DVD Menu. People skilled in the art will appreciate how this concept can be further extended with other combinations of bit patterns.

Although the data exchange—using Control Movies and IR commands—will take some time, the methods and techniques provided in example embodiments of this invention can be used to exchange bytes between the DVD player 106 and the microcontroller 111. People skilled in the art recognize that a protocol—with commands and data parameters—can be worked out between the DVD player 106 and the microcontroller 111 in which each command can be represented by one or more bytes. In case the commands require additional parameters or arguments additional bytes can be exchanged. The protocol can implement acknowledge mechanisms and error correction using checksums.

Figure 41:
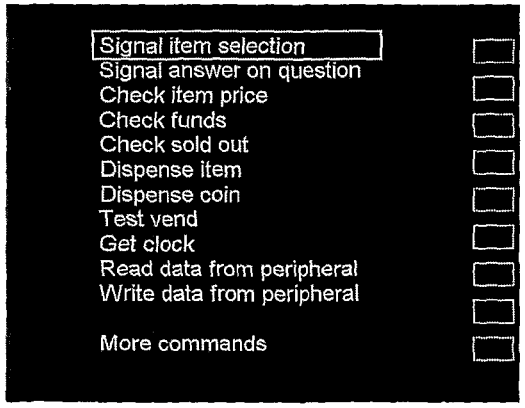
FIG. 41 shows an Example vending command set

Using the method above one can signal a set of vending commands from the DVD player 106 to the microcontroller 111—instead of signaling only the selected beverage/item selection—and process feedback information from the microcontroller 111 on the DVD player 106. FIG. 41 shows an example vending command set for exchanging vending data between the DVD player and the microcontroller.

Figure 42:
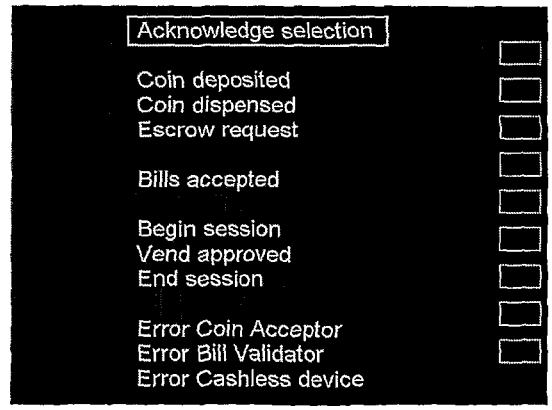
FIG. 42 shows a Screenshot of an example Event DVD Menu

In one embodiment of this invention we provided methods and techniques to implement a solution for signaling a coin insertion event from the microcontroller 111 to the DVD player 106 by using an invisible menu item in the Selections DVD Menu. To allow the processing of more event types, the invisible menu item button could jump to an Event DVD Menu instead of the Coin Insertion DVD Menu up front. The microcontroller 111 will first signal the event type, e.g. 1) Coin insertion 2) Error detected, 3) Etc. and afterwards the event value. In case the event type corresponds to coin insertion, the DVD player 106 will jump to the Coin Insertion DVD Menu and the microcontroller 111 will send the IR command for the coin type through the IR sender 114. FIG. 42 shows a screenshot of an example Event DVD Menu.

People skilled in the art will recognize that the methods and techniques in different embodiments of this invention can be used to implement an MDB peripheral device (Slave) or an Executive peripheral device (Master), which provides Item selection in a graphical user interface, multimedia advertising and info kiosk capabilities.

Typically, the peripheral device is connected to the connectors on the motherboard of the vending machine's central processor, by connecting the connectors of the peripheral device to the corresponding connectors of the central processor by using a suitable data transfer cable. When communicating with the vending machine, the peripheral device uses the standard vending machine protocols commonly used: the MDB protocol or the Executive protocol, to be more precise.

An example embodiment for the MDB Slave device—providing a graphical user interface, multimedia advertising and info kiosk capabilities—comprises:
  a stand-alone consumer DVD player 106
  a display device 108 for displaying video images connected to the video output of said DVD player 106
  optional speakers connected to one or more audio outputs of said DVD player 106
  a microcontroller 111
  an IR sender 114
  electronics associated with said microcontroller 111 and the Master Vending Machine Controller 100 of a vending machine
  electronics associated with said microcontroller 111 and said IR sender 114 electronics associated with the selection panel 101 of said vending machine and said microcontroller 111.

When implementing the methods and techniques of our invention, based on Audio Control Movies, the MDB peripheral Slave device further comprises:

a DTMF decoder circuit 110 connected to the audio outputs of said DVD player 106 electronics associated with said DTMF decoder circuit 110 and said microcontroller 111

When implementing the methods and techniques of our invention, based on Video Control Movies, the MDB peripheral Slave device further comprises:

an optical sensor unit 109 sensing a specific region on said display device 108 electronics associated with said optical sensor unit 109 and said microcontroller 111

The MDB peripheral Slave device using the methods and techniques of our invention will provide a graphical user interface for operating said vending machine, characterized in that said graphical user interface is implemented as DVD Menu structures on a DVD disc medium placed in said DVD player 106.

The MDB peripheral Slave device will have its own unique Peripheral Address. When designing and field testing potential new MDB devices, Experimental Peripheral Addresses can be used. These addresses are temporary and once the new device is approved by NAMA and the EVA, the device will be assigned a different permanent peripheral address.

To integrate the MDB Slave device in an existing vending machine, changes are made to the instruction code on the VMC 100, to make use of the new MDB Slave device.

Figure 4:
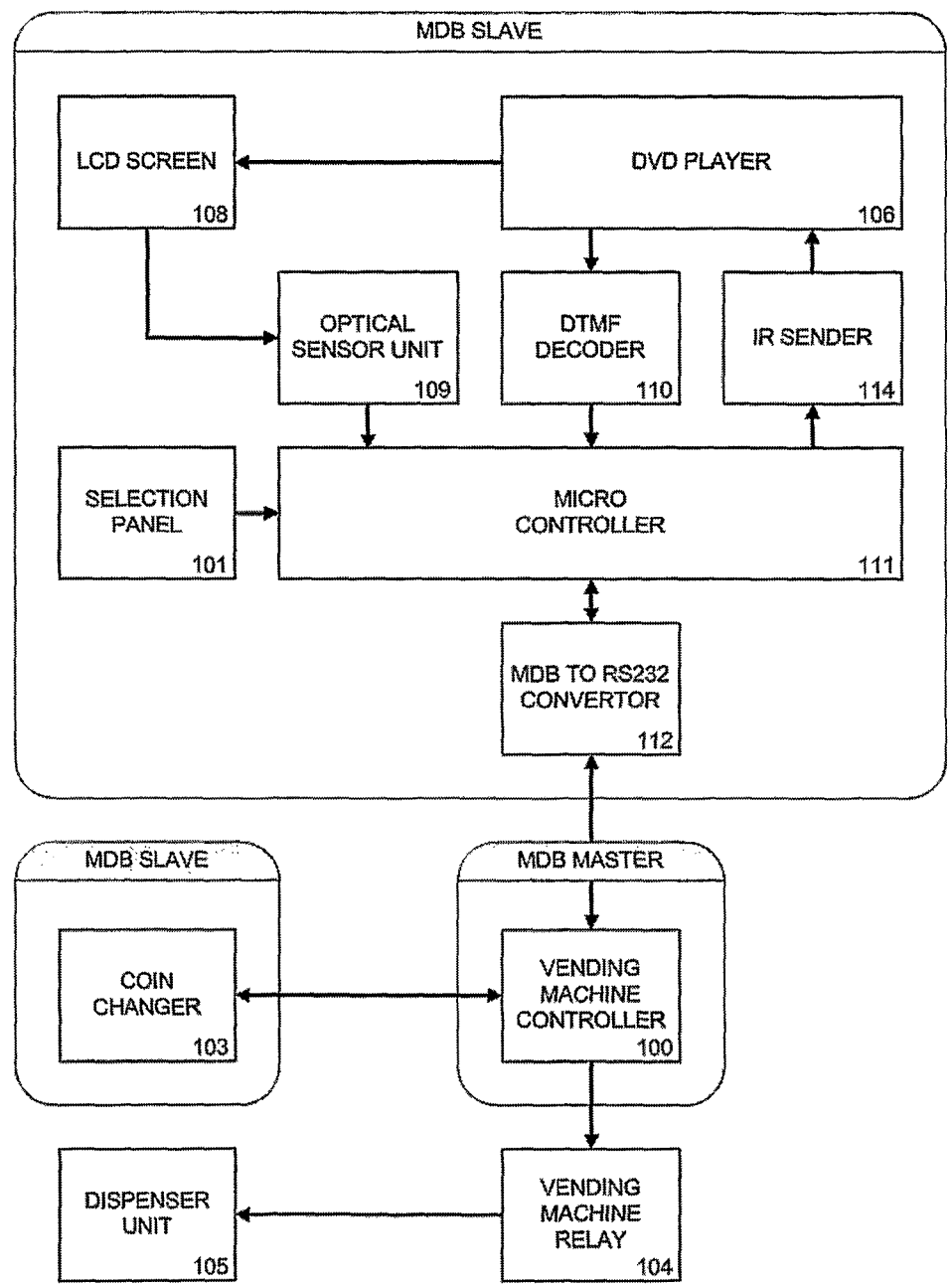
FIG. 4 is a Block diagram of an Item Selection/Media Device MDB Slave peripheral

The MDB peripheral Slave device in which the DVD player 106 is used both for Item selection in a graphical user interface and as a Media player device is hereinafter referred to as Interactive GUI/Media MDB Slave device or in short IGM peripheral or IGM device. FIG. 4 shows the Block diagram of the IGM peripheral.

In this embodiment, the pseudo code of both the DVD program instructions and the microcontroller program to implement the IGM peripheral could look like the pseudo code described below. One skilled in the art will recognize that enhancements or alterations may be made to the pseudo code below, yet still achieve the purposes described herein:

The VMC 100 (MDB Master) will poll the IGM peripheral for activity. As long as the IGM peripheral is in input mode (no selection has been made yet in the Selections DVD Menu and the microcontroller 111 is in input mode), the IGM peripheral will respond to the VMC 100 with answer IDLE. When a selection has been made in the Selections DVD Menu, the microcontroller 111 is informed about the actual beverage/item selection, and switches from input mode to decision mode. When the VMC 100 polls the IGM peripheral while in decision mode, the IGM peripheral will respond to the VMC 100 with ITEM SELECTED and the item number. The VMC 100 will check 1) if the item is still available and 2) if the inserted credit amount is greater than or equal to the item price.

When the item is sold out the VMC 100 (MDB Master) will send the SOLD OUT command to the IGM device (MDB Slave). The microcontroller 111 inside the IGM device (in decision mode), gets informed about the decision from the VMC 100 and will send through the IR sender 114 the IR command corresponding to numerical value "1" to the DVD player 106 to activate the first invisible menu item in the Decision DVD Menu. When the customer did not insert enough credit, the VMC 100 (MDB Master) will send the LOW FUNDS command to the IGM device (MDB Slave). The microcontroller 111 inside the IGM device (in decision mode), gets informed about the decision from the VMC 100 and will send through the IR sender 114 the IR command corresponding to numerical value "2" to the DVD player 106 to activate the second invisible menu item in the Decision DVD Menu.

When the item is still available and the customer did insert enough credit, the VMC 100 (MDB Master) will send the VEND APPROVED command to the IGM device (MDB Slave). The microcontroller 111 inside the IGM device (in decision mode), gets informed about the decision from the VMC 100 and will send through the IR sender 114 the IR command corresponding to numerical value "3" to the DVD player 106 to activate the third invisible menu item in the Decision DVD Menu.

As long as the DVD player 106 is playing a movie (the microcontroller 111 is not in input mode yet) the IGM peripheral will answer BUSY PLAYING when the VMC 100 (MDB Master) polls the IGM device (MDB Slave).

When the VMC 100 (MDB Master) polls the IGM device (MOB Slave) after the video clip finished playing, the IGM peripheral will respond to the VMC 100 with DISPENSE NOW. The VMC 100 will dispense the item after the video clip has been played.

When the VMC 100 (MDB Master) polls the IGM device (MDB Slave) after the item has been dispensed, the IGM peripheral will respond to the VMC 100 with IDLE.

When the customer inserts a coin in the coin changer 103, the VMC 100 will send the COIN INSERT command to the IGM peripheral when the peripheral is in IDLE mode. When the coin changer 103 dispenses coins to the customer, the VMC 100 will send the COIN DISPENSE command to the IGM peripheral when the peripheral is in IDLE mode. The microcontroller 111 inside the IGM device (in input mode), gets informed about coin insertion or coin removal and will send through the IR sender 114 the IR command corresponding to numerical value "9" to the DVD player 106 to activate the hidden menu item in the Selections DVD Menu, which will instruct the DVD player 106 to jump from the Selections DVD Menu to the Coin Insertion DVD Menu.

When the VMC 100 (MDB Master) polls the IGM device (MDB Slave) the IGM peripheral will respond to the VMC with READY TO RECEIVE COIN TYPE. The VMC 100 will send the COIN TYPE to the IGM peripheral when the peripheral is in READY TO RECEIVE COIN TYPE mode. The microcontroller 111 inside the IGM device, gets informed about the coin type and will send through the IR sender 114 the IR command corresponding to the proper coin type to the DVD player 106 to activate a menu item in the Coin Insertion DVD Menu. The DVD player 106 will add the coin value to the current credit value in a GPRM register and will jump to the Selections DVD Menu indicating the current credit value in the background image.

People skilled in the art will recognize similar challenges when integrating the methods and techniques of our invention in a peripheral device according to the Executive system.

One skilled in the art will recognize that the methods and techniques in different embodiments of this invention, combined with the functionalities of the IGM peripheral can be used to author DVD discs with special promotional features, including but not limited to a random video clip that will dispense two drinks for the price of one, a random video clip that will dispense your drink and dispenses your money back (free drink), etc. The methods and techniques could also be used to transform a vending machine into a multimedia jukebox where video clips, audio clips or any other type of multimedia clip can be played after the customer selects them by navigating a DVD Menu and optionally inserts the proper credit amount in the vending machine. Jukebox functionality can be added on top of existing beverage machines. These hybrid machines can dispense beverages or other items, and also playback video clips, audio clips or any other type of multimedia clip.

People skilled in the art appreciate how the techniques and methods in the embodiments of this invention—based on interfacing the DVD player 106 with a microcontroller 111—can be used to provide the DVD player 106 1) a memory expansion, 2) means to control devices such as vending machines or any other electronic device interfacing with a microcontroller 111 or similar, 3) new instructions, 4) a capability to handle events signaled by a microcontroller 111 or device. The memory expansion on the DVD player 106 could be useful for DVD games which today are limited due to the DVD player memory limitations.

A wide number of applications is possible using today's microcontroller technology. By using the techniques and methods of this invention, people skilled in the art will realize how these applications could benefit from the additional graphical user interface and multimedia capabilities provided by a consumer DVD player.

People skilled in the art will also realize how DVD players can benefit from the techniques and methods of this invention. E.g. The DVD player could request time and date information from the microcontroller. If the microcontroller is connected to other devices, the DVD player could send device commands to the microcontroller, which passes on these commands to a device. One device could be a printer to print receipts. Some microcontrollers have a built-in TCP/IP stack, which could be used to signal a message from the DVD player to a remote server.

When future enhancements are made to DVD players, or DVD-like players (BlueRay, etc.) in a future DVD or DVD-like standard, and when these enhancements include interfacing capabilities added to the DVD player, people skilled in the art will recognize that these interfacing capabilities of the DVD player can be used. By using these future interfacing capabilities of the DVD player, the methods and techniques provided in different embodiments of this invention will not require the complexities of the example embodiments described herein.

Although described in terms of the current DVD platform technology, one skilled in the art will appreciate that the methods and techniques described in this invention are applicable to future platforms of both DVD and DVD-like technology and other technologies that may present similar obstacles for integrating/interfacing the said platform in/with a vending machine or other electronic appliances, where the storage medium of the said platform contains both the graphical user interface and the video clips. Future DVD-like platforms could support different types of media including but not limited to BlueRay, HD-DVD, memory sticks, USB sticks or any other high capacity medium suitable to store digital encoded video assets. In case these platforms support at least a level of user interactivity, comparable to the navigation features available in the current DVD platform technology, one skilled in the art will appreciate how the methods and techniques presented as different embodiments in this invention can be applied to the said future platforms without deviating from the spirit and scope of the invention.

The invention claimed is:

1. An apparatus to control a vending machine, said apparatus comprising:
   a playback device;
   a display device coupled to said playback device; and
   an interface between said playback device and said vending machine,
   wherein said playback device is a device that can play back digital encoded video assets, and is operated by a graphical user interface that supports at least a level of user interactivity and navigation features to navigate within menus, select a specific chapter/movie scene and play back a video clip,
   wherein said graphical user interface of said playback device provides user interactivity and navigation features to select items in said vending machine,
   wherein said interface provides a protocol between said playback device and said vending machine, said protocol comprises a vending command set to control said vending machine from said playback device over said interface, said playback device to use said vending command set to control said vending machine, and
   wherein said vending command set comprises a vending command for said vending machine to dispense an item selected in said graphical user interface.

2. The apparatus according to claim 1, wherein said apparatus is integrated into said vending machine.

3. The apparatus according to claim 1, wherein said vending machine dispenses said item after said playback device plays a video clip associated with said item selected in said graphical user interface.

4. The apparatus according to claim 3, wherein said vending machine dispenses said item after said video clip is finished playing by said playback device.

5. The apparatus according to claim 1, wherein said vending command set further comprises a vending command to check or monitor an item availability in said vending machine on said playback device.

6. The apparatus according to claim 1, wherein said vending command set further comprises a vending command to check a credit status or monitor credit activity in said vending machine on said playback device.

7. The apparatus according to claim 1, wherein said interface is configured such that said apparatus is to control said vending machine from said media playback device without any hardware modification to said playback device.

8. The apparatus according to claim 1, wherein said interface is configured such that said apparatus is to control said vending machine from said playback device without having to replace or modify a vending machine controller in said vending machine, and whereby said vending machine controller in said vending machine is responsible for control of and activities in said vending machine.

9. The apparatus according to claim 1, wherein said interface is configured such that said apparatus is to control said vending machine from said playback device without having to modify a software program running on a vending machine controller in said vending machine.

10. The apparatus according to claim 1, wherein said playback device is operated by a touch screen integrated into said display device, and whereby said user interactivity with said vending machine is performed by selecting items on said touch screen.

11. The apparatus according to claim 1, wherein said playback device is a DVD player, a DVD-like player, or a Blu-ray player.

12. The apparatus according to claim 1, wherein said apparatus is a vending machine peripheral device and communicates with a vending machine controller in said vending machine through a standard vending machine peripheral bus in said vending machine.

13. The apparatus according to claim 1, wherein said interface further comprises:
  a microcontroller;
  an interface between said playback device and said microcontroller; and
  an interface between said microcontroller and said vending machine, wherein said microcontroller implements said protocol between said playback device and said vending machine.

14. The apparatus according to claim 13, wherein said microcontroller is to check or monitor an item availability and/or check a credit status or monitor a credit activity in said vending machine through said interface between said microcontroller and said vending machine, wherein said graphical user interface is to display said item availability and/or said credit status or said credit activity.

15. A method to control a vending machine, said method comprising the steps of:
  1) integrating said apparatus of claim 1 in said vending machine; and
  2) providing an interface between said playback device and said vending machine,
  wherein said interface provides a means to said apparatus for:
    selecting an item in said graphical user interface implemented by said apparatus;
    signaling an item selection made in said graphical user interface to said vending machine; and
    instructing said vending machine to dispense a product from said vending machine to a merchandise removal area.

16. The method according to claim 15, wherein said steps further comprise: modifying a program instruction code on a vending machine controller in said vending machine to integrate said apparatus in operation of said vending machine.

17. The method according to claim 15 wherein said interface between said playback device and said vending machine provides a means to said apparatus for passing information from said playback device to said vending machine.

18. The method according to claim 17, wherein said playback device is to signal an item selection made in said graphical user interface to said vending machine through said interface between said playback device and said vending machine.

19. The method according to claim 18, wherein said interface between said playback device and said vending machine comprises an interface between said playback device and a keyboard decoder in said vending machine.

20. The method according to claim 19, wherein said playback device signals an item selection made in a selections menu to said keyboard decoder of said vending machine by playing an audio or video control movie, and wherein said interface comprises a DTMF decoder, an optical sensor unit, or a demodulation circuit which is connected to audio or video outputs of said playback device and decodes said audio or video control movie into signals for said keyboard decoder to instruct said vending machine to dispense said selected item.

21. The method according to claim 17, wherein said playback device communicates with said vending machine through a standard vending machine peripheral bus in said vending machine.

22. The method according to claim 15, further comprising the step of connecting the selection panel in said vending machine or additional buttons to the control unit of said playback device to forward key presses on said selection panel or said additional buttons to said playback device, wherein said interface between said selection panel or said additional buttons and said control unit, provides a means to said apparatus for navigating in said graphical user interface.

23. The method according to claim 15, further comprising the step of playing a video clip or a sequence of video clips on said playback device from at least one of:
  either after an item is selected and before the item is dispensed on said vending machine to implement a delayed vending scenario; and
  either when the vending machine is unattended for a specific period of time using timeout features in said playback device menu structure.

24. The method according to claim 23, wherein said video clip is a commercial clip, and thus converts said vending machine from an item dispenser into a media channel for effective local commercials, or an information kiosk clip, and thus converts said vending machine from an item dispenser into an information kiosk channel.

25. A method to control a vending machine, said method comprising the steps of:
  1) integrating said apparatus of claim 13 in said vending machine; and
  2) providing an interface between said playback device and said microcontroller and an interface between said microcontroller and said vending machine, wherein said interfaces provide a means to said apparatus for:
    selecting an item in the graphical user interface implemented by said apparatus;
    checking or monitoring item availability in said vending machine;
    checking credit status or monitoring credit activity in said vending machine;
    signaling an item selection made in said graphical user interface to said vending machine; and
    instructing said vending machine to dispense a product from said vending machine to a merchandise removal area.

26. The method according to claim 25, wherein said interface between said playback device and said microcontroller in said apparatus provides a means to said apparatus for passing information from said playback device to said microcontroller.

27. The method according to claim 26, wherein said playback device passes information to said microcontroller by playing an audio or video control movie, and wherein said interface comprises a DTMF decoder, an optical sensor unit, or a demodulation circuit, which is connected to audio or video outputs of said playback device and decodes said audio or video control movie into signals for said microcontroller.

28. The method according to claim 26, wherein said playback device is to signal an item selection made in said graphical user interface to said microcontroller through said interface between said playback device and said microcontroller.

29. The method according to claim 25, wherein said interface between said microcontroller and said vending machine provides a means to said apparatus for passing information from said vending machine to said microcontroller.

30. The method according to claim 29, wherein said microcontroller is to check or monitor item availability in said vending machine through said interface between said microcontroller and said vending machine.

31. The method according to claim 30, wherein said microcontroller checks or monitors item availability in said vending machine by sensing a status of one or more sold out light emitting diodes (LEDs) in said vending machine.

32. The method according to claim 30, wherein said microcontroller checks or monitors item availability in said vending machine by monitoring a drop sensor in said vending machine.

33. The method according to claim 29, wherein said microcontroller checks said credit status or monitors said credit activity in said vending machine through said interface between said microcontroller and said vending machine.

34. The method according to claim 33, wherein said microcontroller checks said credit status or monitors said credit activity in said vending machine by monitoring communication between a payment system and said vending machine controller in said vending machine.

35. The method according to claim 25, wherein said interface between said microcontroller and said playback device in said apparatus provides a means to said apparatus for passing information from said microcontroller to said playback device.

36. The method according to claim 35, wherein said graphical user interface comprises a menu with hidden menu items to process information from said microcontroller on said playback device, wherein said playback device is to jump to said menu with hidden menu items and will wait for said information from said microcontroller, said microcontroller is to send an IR command to said playback device through an IR sender or a direct physical connection to the receiver interface of said playback device, to select a menu item in said menu with hidden menu items.

37. The method according to claim 35, wherein said microcontroller is to signal said item availability in said vending machine to said playback device through said interface between said microcontroller and said playback device.

38. The method according to claim 35, wherein said microcontroller is to signal said credit status or credit activity in said vending machine to said playback device through said interface between said microcontroller and said playback device.

39. The method according to claim 35, wherein said interface between said microcontroller and said vending machine provides a means to said apparatus for passing information from said microcontroller to said vending machine.

40. The method according to claim 39, wherein said microcontroller is to instruct said vending machine to dispense an item through said interface between said microcontroller and said vending machine.

41. The method according to claim 40, wherein said microcontroller instructs said vending machine to dispense an item by generating an output signal on a keyboard decoder in said vending machine.

42. The method according to claim 25, wherein said interface between said microcontroller and said vending machine provides a means to said microcontroller to communicate with said vending machine.

43. The method according to claim 42, wherein said microcontroller communicates with said vending machine through a standard vending machine peripheral bus in said vending machine.

44. The method according to claim 25, said steps further comprising:
connecting a selection panel in said vending machine or additional buttons to an input port of said microcontroller, wherein said microcontroller forwards key presses on said selection panel or said additional buttons to said playback device by sending an IR command to said playback device through an IR sender or a direct physical connection to a receiver interface of said playback device, wherein said interface between said selection panel or said additional buttons and said input port, and said interface between said microcontroller and said IR sender or said direct physical connection, provides a means to said apparatus for navigating in said graphical user interface.

45. The method according to claim 25, said steps further comprising:
playing a video clip or a sequence of video clips on said playback device from at least one of:
after an item is selected and before said item is dispensed on said vending machine to implement a delayed vending scenario; and
when said vending machine is unattended for a specific period of time using timeout features in said playback device menu structure.

46. The method according to claim 45, wherein said video clip is at least one of:
a commercial clip, and thus converts said vending machine from an item dispenser into a media channel for effective local commercials;
an information kiosk clip, and thus converts said vending machine from an item dispenser into an information kiosk channel;
a sold out video information message to inform a consumer that said item is not available; and
a low funds video information message to inform a consumer that there is not enough credit available.

47. A protocol to control a vending machine from a playback device,
wherein said playback device is a device that can play back digital encoded video assets, and is operated by a graphical user interface that supports at least a level of user interactivity and navigation features to navigate within menus, select a specific chapter/movie scene and play back a video clip,
wherein said graphical user interface of said playback device provides user interactivity and navigation features to select items in said vending machine,
said protocol between said playback device and said vending machine comprises a vending command set to control said vending machine from said playback device over an interface between said playback device and said vending machine, said playback device to use said vending command set to control said vending machine, and
wherein said vending command set comprises a vending command for said vending machine to dispense an item selected in said graphical user interface.

48. An interface to control a vending machine from a playback device,
wherein said playback device is a device that can play back digital encoded video assets, and is operated by a graphical user interface that supports at least a level of user interactivity and navigation features to navigate within menus, select a specific chapter/movie scene and play back a video clip,
wherein said graphical user interface of said playback device provides user interactivity and navigation features to select items in said vending machine,
said interface provides a protocol between said playback device and said vending machine, said protocol comprises a vending command set to control said vending machine from said playback device over said interface between said playback device and said vending machine, said playback device to use said vending command set to control said vending machine, and wherein said vending command set comprises a vending command for said vending machine to dispense an item selected in said graphical user interface.

49. A vending machine wherein a graphical user interface for operating said vending machine is implemented by integrating an apparatus according to claim 1.

* * * * *